United States Patent
Stirling-Gallacher et al.

(10) Patent No.: US 10,932,234 B2
(45) Date of Patent: Feb. 23, 2021

(54) SYSTEM AND METHOD FOR TIME DIVISION DUPLEXED MULTIPLEXING IN TRANSMISSION-RECEPTION POINT TO TRANSMISSION-RECEPTION POINT CONNECTIVITY

(71) Applicant: Futurewei Technologies, Inc., Plano, TX (US)

(72) Inventors: Richard Stirling-Gallacher, San Diego, CA (US); Lili Zhang, Beijing (CN); Nathan Edward Tenny, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 95 days.

(21) Appl. No.: 16/142,970

(22) Filed: Sep. 26, 2018

(65) Prior Publication Data

US 2019/0068237 A1 Feb. 28, 2019

Related U.S. Application Data

(63) Continuation of application No. 15/289,638, filed on Oct. 10, 2016, now Pat. No. 10,116,349.

(Continued)

(51) Int. Cl.
*H04W 72/04* (2009.01)
*H04B 7/06* (2006.01)
(Continued)

(52) U.S. Cl.
CPC ........ *H04W 72/0406* (2013.01); *H04B 7/022* (2013.01); *H04B 7/0408* (2013.01);
(Continued)

(58) Field of Classification Search
CPC ......... H04W 72/0406; H04W 72/1278; H04W 72/0426; H04W 72/0433; H04W 72/0446;
(Continued)

(56) References Cited

U.S. PATENT DOCUMENTS

2012/0002591 A1 1/2012 Noh et al.
2012/0069835 A1 3/2012 Nakamura
(Continued)

FOREIGN PATENT DOCUMENTS

CN 101877856 A 11/2010
CN 102196581 A 9/2011
(Continued)

OTHER PUBLICATIONS

Goldsmith, et al., "A Measurement-Based Model for Predicting Coverage Areas of Urban Microcells," IEEE Journal on Selected Areas in Communications, vol. 11, No. 7, Sep. 1993, 11 pages.
(Continued)

*Primary Examiner* — Joshua Kading
(74) *Attorney, Agent, or Firm* — Slater Matsil, LLP

(57) ABSTRACT

A method for operating a transmission-reception point (TRP) includes determining a first cycle of backhaul communications modes for the TRP, each backhaul communications mode of the first cycle is associated with a different time period and prompts the TRP to either transmit or receive using a subset of communications beams available to the TRP during an associated time period, wherein the communications beams used by the TRP and neighboring TRPs of the TRP in each associated time period are selected to prevent mutual interference, and wherein at least one backhaul communications mode of the first cycle prompts the TRP to either transmit or receive using all of the communications beams available to the TRP, determining a backhaul frame configuration for the TRP in accordance (Continued)

with the first cycle, the backhaul frame configuration specifying an arrangement of subframes of a frame used for backhaul communications.

28 Claims, 19 Drawing Sheets

Related U.S. Application Data

(60) Provisional application No. 62/341,877, filed on May 26, 2016.

(51) Int. Cl.

| | | |
|---|---|---|
| *H04B 7/08* | (2006.01) | |
| *H04W 16/28* | (2009.01) | |
| *H04L 5/00* | (2006.01) | |
| *H04W 72/12* | (2009.01) | |
| *H04B 7/022* | (2017.01) | |
| *H04B 7/0491* | (2017.01) | |
| *H04B 7/0408* | (2017.01) | |
| *H04L 5/14* | (2006.01) | |
| *H04W 56/00* | (2009.01) | |
| *H04W 16/32* | (2009.01) | |
| *H04W 88/08* | (2009.01) | |
| *H04W 92/20* | (2009.01) | |
| *H04W 84/02* | (2009.01) | |

(52) U.S. Cl.
CPC ......... *H04B 7/0491* (2013.01); *H04B 7/0695* (2013.01); *H04B 7/088* (2013.01); *H04L 5/003* (2013.01); *H04L 5/0005* (2013.01); *H04L 5/0073* (2013.01); *H04L 5/0091* (2013.01); *H04L 5/1469* (2013.01); *H04W 16/28* (2013.01); *H04W 16/32* (2013.01); *H04W 56/001* (2013.01); *H04W 72/046* (2013.01); *H04W 72/0426* (2013.01); *H04W 72/0433* (2013.01); *H04W 72/0446* (2013.01); *H04W 72/1263* (2013.01); *H04W 72/1278* (2013.01); *H04W 72/0453* (2013.01); *H04W 84/02* (2013.01); *H04W 88/08* (2013.01); *H04W 92/20* (2013.01)

(58) Field of Classification Search
CPC ........... H04W 72/046; H04W 72/1263; H04W 72/0453; H04W 52/001; H04W 16/28; H04W 16/32; H04W 16/10; H04W 92/20; H04W 84/02; H04W 88/08; H04B 7/022; H04B 7/0695; H04B 7/0491; H04B 7/0408; H04B 7/088; H04L 5/0073; H04L 5/1469; H04L 5/0005; H04L 5/003; H04L 5/0091
See application file for complete search history.

(56) References Cited

U.S. PATENT DOCUMENTS

| | | |
|---|---|---|
| 2014/0204846 A1 | 7/2014 | Maltsev et al. |
| 2015/0036571 A1 | 2/2015 | Taori et al. |
| 2016/0183232 A1 | 6/2016 | Stirling-Gallacher et al. |
| 2017/0048775 A1 | 2/2017 | Kim |

FOREIGN PATENT DOCUMENTS

| | | |
|---|---|---|
| CN | 102468904 A | 5/2012 |
| JP | 2012085263 A | 4/2012 |
| KR | 20160040595 A | 4/2016 |
| WO | 2011018722 A1 | 2/2011 |

OTHER PUBLICATIONS

"Diamond Shaped Cell Layouts for Above 6 GHz Channel Modeling," 3GPP TSG RAN WG1 Meeting #84, R1-160924, St. Julian's, Malta, Feb. 15-19, 2016, 5 pages.

Taori, et al., "Point-to-Multipoint In-Band mmWave Backhaul for 5G Networks," Millimteter-Wave Communications for 5G, IEEE Communications Magazine, Jan. 2015, 7 pages.

TDD FRAME FORMAT FOR ACCESS
(EXTENDED IN TIME, TO ALLOW LONGER S PORTION)

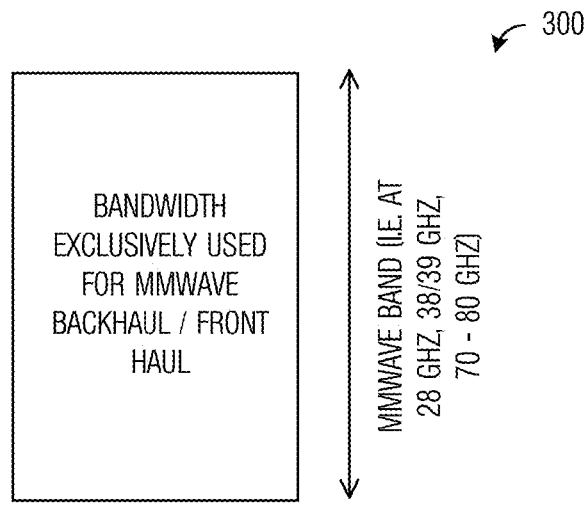
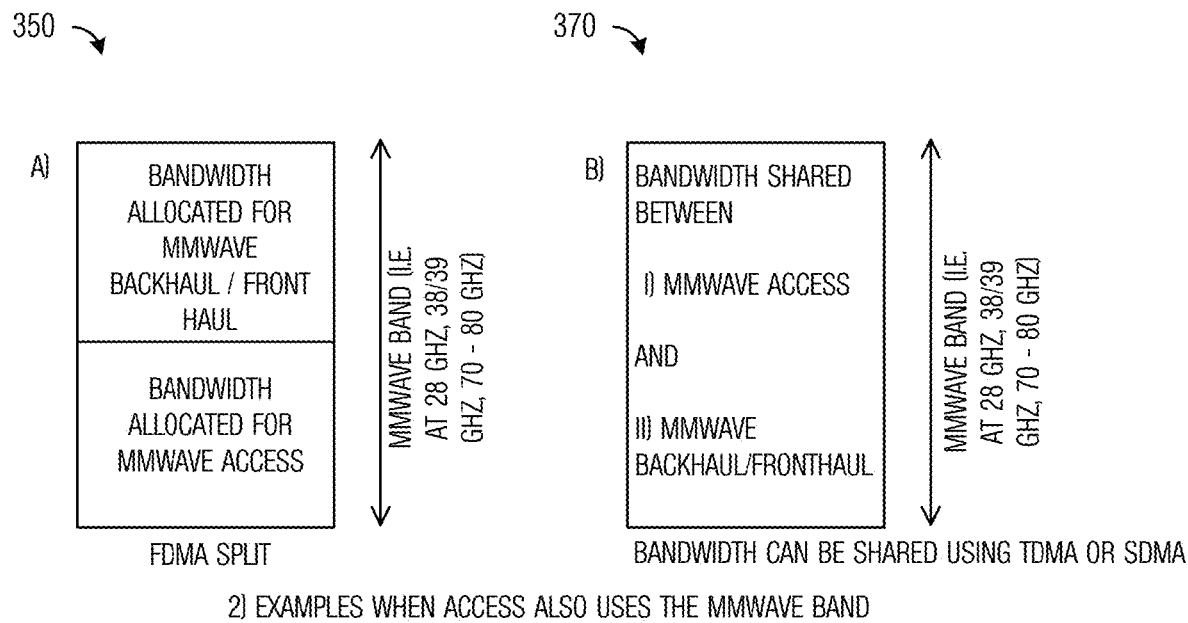

9-SITE DIAMOND
CLUSTER

# US 10,932,234 B2

SYSTEM AND METHOD FOR TIME DIVISION DUPLEXED MULTIPLEXING IN TRANSMISSION-RECEPTION POINT TO TRANSMISSION-RECEPTION POINT CONNECTIVITY

CROSS-REFERENCE TO RELATED APPLICATIONS

This application is a continuation of U.S. patent application Ser. No. 15/289,638, filed on Oct. 10, 2016, which claims the benefit of U.S. Provisional Application Ser. No. 62/341,877, filed on May 26, 2016, entitled "System and Method for Time Division Duplexed Multiplexing in Transmission Point to Transmission-Reception Point Connectivity," both of which applications are hereby incorporated by reference herein in their entireties.

TECHNICAL FIELD

The present invention relates generally to a system and method for digital communications, and, in particular embodiments, to a system and method for time division duplexed (TDD) multiplexing in transmission-reception point (TRP) to TRP connectivity.

BACKGROUND

Future wireless communications systems are operating at ever higher carrier frequencies in a quest to find greater bandwidth and less interference. These wireless communications systems may operate at frequencies of 6 GHz and above. In order to fully utilize the greater bandwidth available in the wireless communications systems, transmission-reception points (TRPs) may require more bandwidth and less latency than what is afforded in existing backhaul and/or fronthaul connections. Furthermore the density of the TRPs is likely to be much higher than current deployments and the cost of laying wireline high capacity backhaul connections to all of these TRPs can be prohibitive. Additionally, in certain situations some TRPs may be temporal in nature or mobile and may not be able to support a wireline connection.

SUMMARY

Example embodiments provide a system and method for TDD multiplexing in TRP to TRP connectivity.

In accordance with an embodiment, a method for operating a network entity in a communications system is provided. The method includes transmitting, by the network entity, a first signal to a plurality of transmission-reception points (TRPs) indicating a plurality of backhaul communication modes. Each backhaul communication mode indicates, to a respective TRP, a corresponding set of beams for backhaul signal communication with a different set of TRPs. The corresponding set of beams are selected from a plurality of beams including a full set of communication beams of the respective TRP. The method further includes transmitting, by the network entity, a second signal to the plurality of TRPs indicating a plurality of backhaul frame configurations. Each backhaul frame configuration indicates, to the respective TRP, an arrangement of subframes in a frame used for backhaul signal communication. In one example, the corresponding set of beams includes the plurality of beams, a first subset of the plurality of beams less than the full set of communication beams of the respective TRP, and a second subset of the plurality of beams mutually exclusive from the first subset. Optionally, in such an example, or in another example, the different set of TRPs includes a plurality of TRPs, a first subset of the plurality of TRPs, and a second subset of the plurality of TRPs mutually exclusive from the first subset. Optionally, in any one of the above mentioned examples, or in another example, each backhaul communication mode further indicates a synchronized order of transmitting and receiving a backhaul signal by each TRP. Optionally, in any one of the above mentioned examples, or in another example, the method further includes assigning, by the network entity, a TRP-type to the respective TRP using a scheduling algorithm. The scheduling algorithm assigns the TRP-type in accordance with a topology of the communications system or a capability of the respective TRP. Optionally, in any one of the above mentioned examples, or in another example, the method further includes assigning, by the network entity, each backhaul communication mode to the respective TRP in accordance with a capability of the respective TRP or the TRP-type of the respective TRP. Optionally, in any one of the above mentioned examples, or in another example, a first subset of subframes in the arrangement of subframes is used for a communication between the respective TRP with one or more user equipments (UEs), and a second subset of subframes in the arrangement of subframes corresponds to a special subframe used for backhaul communication. Optionally, in any one of the above mentioned examples, or in another example, the method further includes receiving, by the network entity, neighbor lists and TRP capability reports from the plurality of TRPs. Optionally, in any one of the above mentioned examples, or in another example, the method further includes receiving, by the network entity, neighbor lists and TRP capability reports from a newly deployed TRP or from a TRP in response to a change in configuration, a change in capabilities, or a change in neighboring TRPs. Optionally, in any one of the above mentioned examples, or in another example, the method further includes receiving information regarding neighbor lists and TRP capability reports during network planning. Optionally, in any one of the above-mentioned examples, or in another example, the network entity is a time division duplexed (TDD) frame configuration entity or a network controlling entity. Optionally, in any one of the above mentioned examples, or in another example, transmitting the second signal further comprises dynamically assigning, by the network entity, a respective time division duplexed (TDD) backhaul frame structure to each TRP. Optionally, in any one of the above mentioned examples, or in another example, transmitting the second signal further comprises semi-statically assigning, by the network entity, a respective time division duplexed (TDD) backhaul frame structure to each TRP. Optionally, in any one of the above mentioned examples, or in another example, transmitting the second signal is over a dedicated connection between each of the plurality of TRPs and the network entity.

In accordance with another embodiment, a network entity operating in a communications system is provided. The network entity includes a non-transitory memory storage including instructions and a processor in communication with the non-transitory memory storage. The processor executes the instructions to transmit a plurality of backhaul communication modes to a plurality of transmission-reception points (TRPs). Each backhaul communication mode indicates, to a respective TRP, a corresponding set of beams for backhaul signal communication with a different set of TRPs, the corresponding set of beams selected from a plurality of beams including a full set of communication beams of the respective TRP. The processor executes instructions to transmit a plurality of backhaul frame configurations to the plurality of TRPs. Each backhaul frame configuration indicates, to the respective TRP, an arrangement of subframes in a frame used for backhaul signal communication. In one example, the corresponding set of beams includes the plurality of beams, a first subset of the plurality of beams less than the full set of communication beams of the respective TRP, and a second subset of the plurality of beams mutually exclusive from the first subset. Optionally, in such an example, or in another example, the different set of TRPs includes a plurality of TRPs, a first subset of the plurality of TRPs, and a second subset of the plurality of TRPs mutually exclusive from the first subset. Optionally, in any one of the above-mentioned examples, or in another example, each backhaul communication mode further indicates a synchronized order of transmitting and receiving a backhaul signal by each TRP. Optionally, in any one of the above-mentioned examples, or in another example, processor executes instructions to assign a TRP-type to the respective TRP using a scheduling algorithm. The scheduling algorithm assigns the TRP-type in accordance with a topology of the communications system or a capability of the respective TRP. Optionally, in any one of the above mentioned examples, or in another example, processor executes instructions to assign each backhaul communication mode to the respective TRP in accordance with a capability of the respective TRP or the TRP-type of the respective TRP. Optionally, in any one of the above mentioned examples, or in another example, a first subset of subframes in the arrangement of subframes is used for a communication between the respective TRP with one or more user equipments (UEs), and a second subset of subframes in the arrangement of subframes corresponds to a special subframe used for backhaul communication. Optionally, in any one of the above mentioned examples, or in another example, the processor executes instructions to receive neighbor lists and TRP capability reports from the plurality of TRPs. Optionally, in any one of the above mentioned examples, or in another example, the processor executes instructions to receive neighbor lists and TRP capability reports from a newly deployed TRP or from a TRP in response to a change in configuration, a change in capabilities, or a change in neighboring TRPs. Optionally, in any one of the above mentioned examples, or in another example, processor executes instructions to receive information regarding neighbor lists and TRP capability reports during network planning. Optionally, in any one of the above-mentioned examples, or in another example, the network entity is a time division duplexed (TDD) frame configuration entity or a network controlling entity. Optionally, in any one of the above mentioned examples, or in another example, transmitting the second signal further comprises semi-statically assigning, by the network entity, a respective time division duplexed (TDD) backhaul frame structure to each TRP. Optionally, in any one of the above mentioned examples, or in another example, transmitting the second signal is over a dedicated connection between each of the plurality of TRPs and the network entity.

In accordance with yet another embodiment, a method for operating a network entity in a communications system is provided. The method includes assigning, by the network entity, a sequential plurality of backhaul communication modes to each of a plurality of transmission-reception points (TRPs) in the communications system. Each backhaul communication mode indicates, to a respective TRP, a corresponding set of beams for a synchronized backhaul signal communication with a different set of TRPs. The method further includes transmitting, by the network entity, a signal to each of the plurality of TRPs indicating the sequential plurality of backhaul communication modes to each of the plurality of TRPs. In one example, a first set of beams for the synchronized backhaul signal communication and a second set of beams for the synchronized backhaul signal communication are mutually exclusive. Optionally, in such an example, or in another example, the assigning of the sequential plurality of backhaul communication modes is based on a position of each respective TRP relative to neighboring TRPs. Optionally, in any one of the above mentioned examples, or in another example, each backhaul communication mode further indicates a synchronized order of transmitting and receiving a backhaul signal by each TRP. Optionally, in any one of the above mentioned examples, or in another example, the method further includes assigning, by the network entity, a TRP-type to the respective TRP using a scheduling algorithm, the scheduling algorithm assigning the TRP-type in accordance with a topology of the communications system or a capability of the respective TRP. Optionally, in any one of the above mentioned examples, or in another example, the method further includes assigning, by the network entity, each backhaul communication mode to the respective TRP in accordance with a capability of the respective TRP or the TRP-type of the respective TRP. Optionally, in any one of the above mentioned examples, or in another example, the method further includes receiving, by the network entity, neighbor lists and TRP capability reports from the plurality of TRPs, from a newly deployed TRP, or from a TRP in response to a change in configuration, a change in capabilities, or a change in neighboring TRPs. Optionally, in any one of the above mentioned examples, or in another example, the network entity is a time division duplexed (TDD) frame configuration entity or a network controlling entity.

In accordance with an example embodiment, a method for operating a transmission-reception point (TRP) is provided. The method includes determining, by the TRP, a first cycle of backhaul communications modes for the TRP, each backhaul communications mode of the first cycle is associated with a different time period and prompts the TRP to either transmit or receive using a subset of communications beams available to the TRP during an associated time period, wherein the communications beams used by the TRP and neighboring TRPs of the TRP in each associated time period are selected to prevent mutual interference, and wherein at least one backhaul communications mode of the first cycle prompts the TRP to either transmit or receive using all of the communications beams available to the TRP, determining, by the TRP, a backhaul frame configuration for the TRP in accordance with the first cycle, the backhaul frame configuration specifying an arrangement of subframes of a frame used for backhaul communications, and communicating, by the TRP, with neighboring TRPs of the TRP in accordance with the first cycle and the backhaul frame configuration.

In accordance with an example embodiment, a method for operating a network entity is provided. The method includes assigning, by the network entity, cycles of backhaul communications modes to TRPs in accordance with an assigned TRP type of each of the TRPs, and assigning, by the network entity, backhaul frame configurations to the TRPs in accordance with the assigned TRP type of each of the TRPs.

In accordance with an example embodiment, a TRP is provided. The TRP includes a processor, and a computer readable storage medium storing programming for execution by the processor. The programming including instructions to configure the TRP to determine a first cycle of backhaul communications modes for the TRP, each backhaul communications mode of the first cycle is associated with a different time period and prompts the TRP to either transmit or receive using a subset of communications beams available to the TRP during an associated time period, wherein the communications beams used by the TRP and neighboring TRPs of the TRP in each associated time period are selected to prevent mutual interference, and wherein at least one backhaul communications mode of the first cycle prompts the TRP to either transmit or receive using all of the communications beams available to the TRP, determine a backhaul frame configuration for the TRP in accordance with the first cycle, the backhaul frame configuration specifying an arrangement of subframes of a frame used for backhaul communications, and communicate with neighboring TRPs of the TRP in accordance with the first cycle and the backhaul frame configuration.

In accordance with an example embodiment, a network entity is provided. The network entity includes a processor, and a computer readable storage medium storing programming for execution by the processor. The programming including instructions to configure the network entity to assign cycles of backhaul communications modes to TRPs in accordance with an assigned TRP type of each of the TRPs, and assign backhaul frame configurations to the TRPs in accordance with the assigned TRP type of each of the TRPs.

Practice of the foregoing embodiments enables each TRP to exchange data and/or control information with each of its direct neighbors, enabling full multi-point connectivity between TRPs with minimal overhead.

Practice of the foregoing embodiments avoids cross-interference, e.g., uplink vs downlink, between adjacent sectors.

Practice of the foregoing embodiments integrates into a 5G mmWave TDD frame structure for access and can adaptively change the uplink and/or downlink subframes for the backhaul (or fronthaul) to suit the demands of the respective TRPs. This may be done in a semi-static or dynamic way.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3A illustrates a bandwidth allocation diagram of a frequency band used for a high frequency backhaul link where access uses a different frequency band according to embodiments presented herein;

FIG. 3B illustrates bandwidth allocation diagrams of a frequency band used for a high frequency backhaul link where access uses the same frequency band according to embodiments presented herein;

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
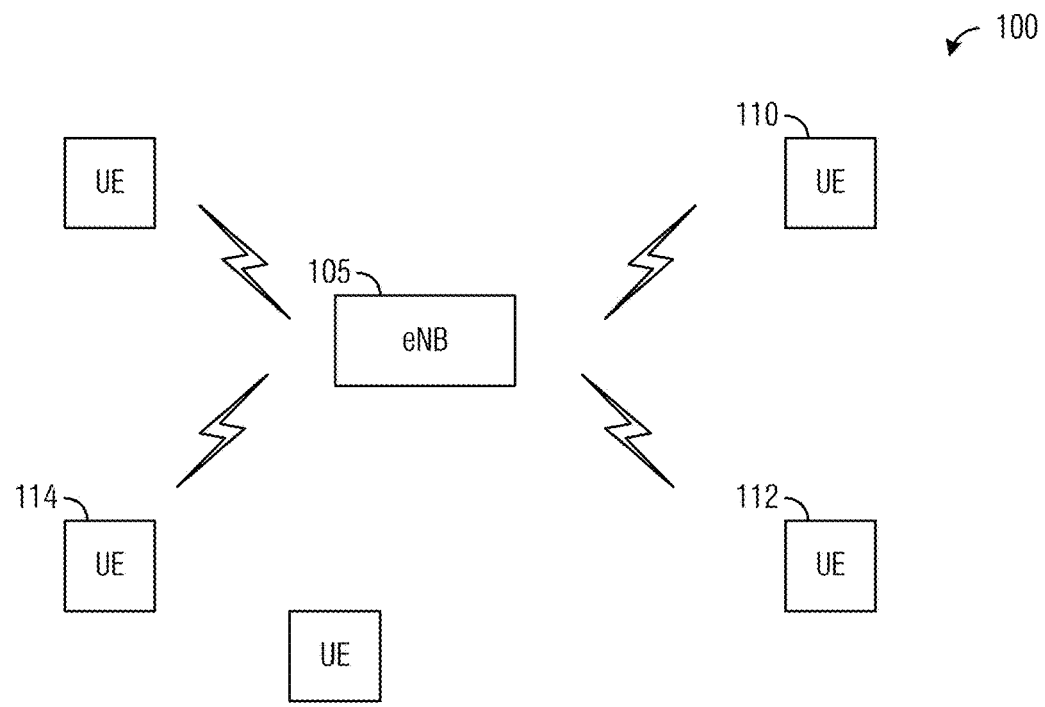
FIG. 1 illustrates an example wireless communications system according to embodiments presented herein.

FIG. 1 illustrates an example wireless communications system loft Communications system 100 includes an evolved NodeB (eNB) 105 serving a plurality of user equipments (UEs), such as UE 110, UE 112, and UE 114. In a first operating mode, transmissions for UEs as well as transmissions by UEs pass through the eNB. The eNB allocates network resources for the transmissions to or from the UEs. eNBs may also be commonly referred to as base stations, NodeBs, master eNBs (MeNBs), secondary eNBs (SeNBs), remote radio heads, access points, and the like, while UEs may also be commonly referred to as mobiles, mobile stations, terminals, subscribers, users, stations, and the like. A base station (or an eNB, NodeB, remote radio head, access point, transmission point, transmit-receive point and so on) that is serving one or more UEs may be referred to as a serving base station (SBS). A transmission point may be used to refer to any device capable of transmitting. Therefore, transmission-reception points (TRP) commonly refer to eNBs, base stations, NodeBs, remote radio heads, access points but can also include UEs, mobiles, mobile stations, terminals, subscribers, users, and the like.

While it is understood that communications systems may employ multiple eNBs (or TRPs) capable of communicating with a number of UEs, only one eNB, and a number of UEs are illustrated for simplicity.

A cell is a commonly used term that refers to a coverage area of an eNB. Typically, a cell is served by one or more sectors of a sectorized antenna of the eNB. Hence, the coverage area of the eNB includes a cell partitioned into a plurality of sectors. As an illustrative example, in a scenario where an eNB uses a three-sector antenna system, the cell of the eNB may be divided into three sectors, with each sector being covered by a separate antenna (with an example beam width of 120 degrees) or a separate part of the total antenna system. As another illustrative example, in a scenario where an eNB uses a six-sector antenna system (where each antenna may cover a 60 degree sector, for example), the cell of the eNB may be divided into six sectors or three sectors, with each sector being covered by one or two antennas or parts sectors of the antenna system respectively.

Figure 2A:
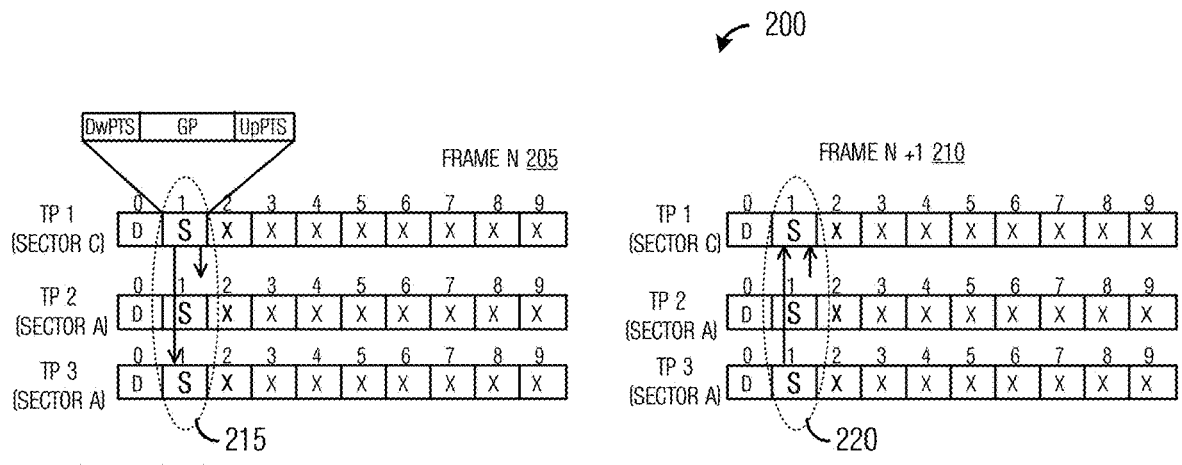
FIG. 2A illustrates example subframe structures for frames N and N+1 according to embodiments presented herein.
Figure 2B:
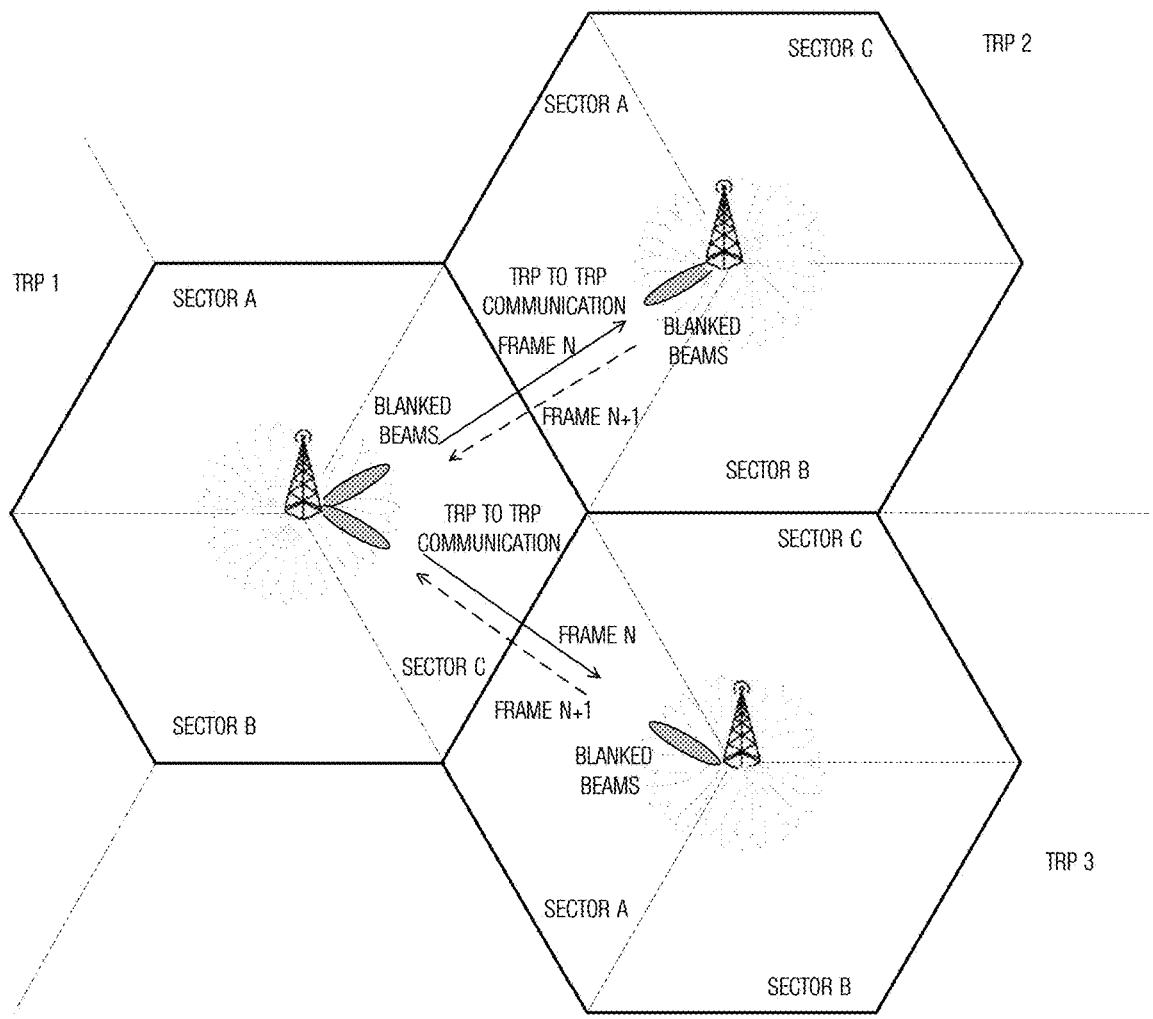
FIG. 2B illustrates an example communications system highlighting communications between sectors and Cells (i.e., eNBs) during the S subframes shown in FIG. 2A according to embodiments presented herein.

In co-assigned U.S. Patent application publication number US 2016/0183232A1, filed Nov. 13, 2015, entitled "System and Method for Interference Coordination in Cellular Millimeter Wave Communications Systems," which is hereby incorporated herein by reference, an example simple time division duplexed (TDD) scheme for fast TRP to TRP communications using a millimeter wave (mmWave) backhaul is presented. A goal of the techniques presented therein was to show that neighboring TRPs may exchange control information on a frame by frame basis (much faster than the present X2 interface) to support features of the example embodiments presented therein, which was for transmission beam blanking to support TDD in mmWave communications systems FIG. 2A illustrates example subframe structures 200 for frames N 205 and N+1 210. In an S subframe 215 of frame N 205, a TRP serving sector C of Cell 1 communicates with a TRP serving sector A of Cell 2 and a TRP serving sector A of Cell 3 (shown as downward pointing arrows), while in an S subframe 220 of frame N+1 210, a TRP serving sector A of Cell 2 and a TRP serving sector A of Cell 3 communicate with a TRP of sector C of Cell 1 (shown as upward pointing arrows). FIG. 2B illustrates an example communications system 230 highlighting communications between TRPs serving the different sectors and cell coverage areas during the S subframes shown in FIG. 2A. It is noted that the beams used in TRP to TRP communications are at least partially blanked, and are referred to as blanked beams.

Figure 2C:
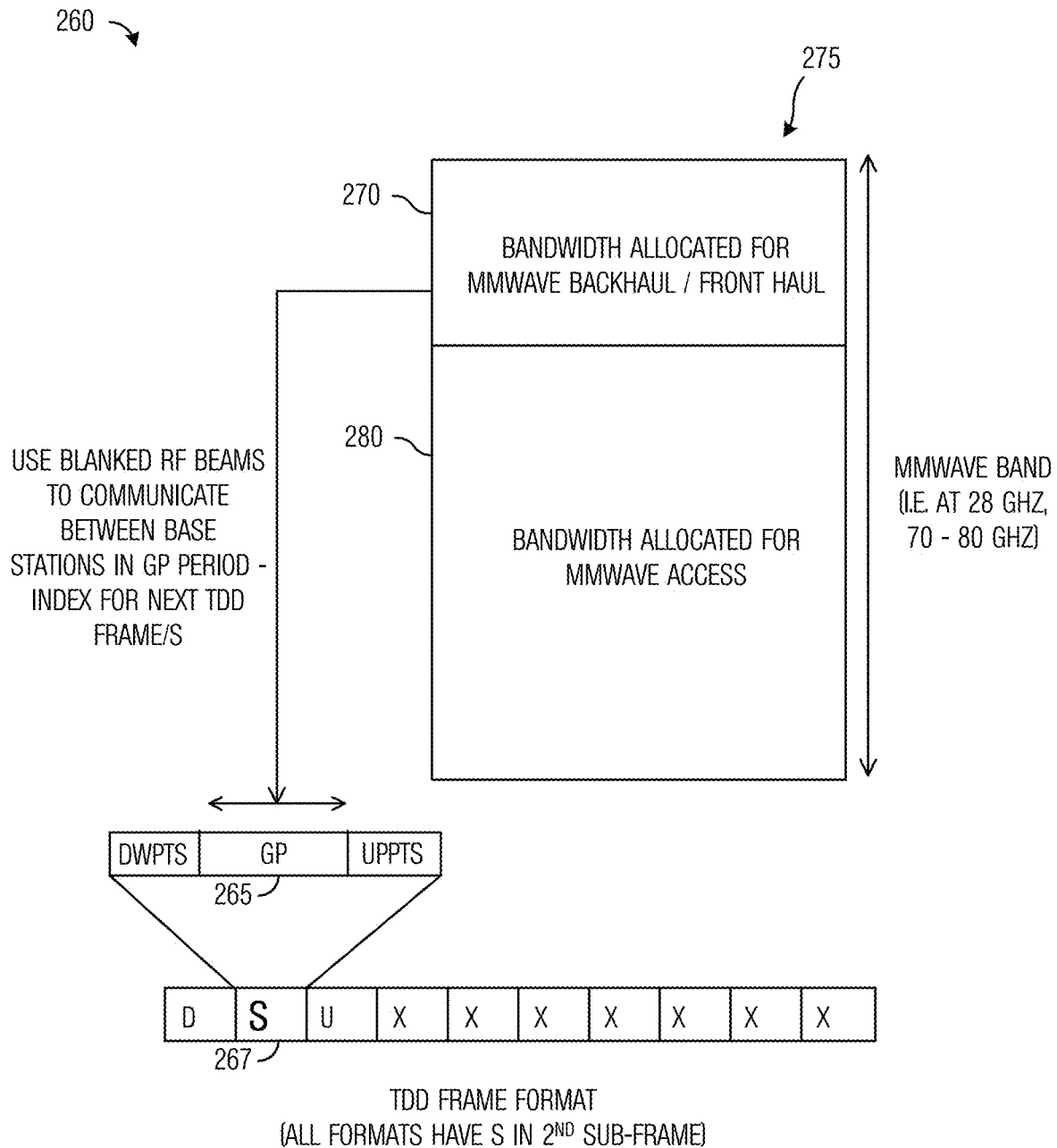
FIG. 2C illustrates an example TDD frame format for signaling frame configuration information between eNBs using a dedicated connection according to embodiments presented herein.

FIG. 2C illustrates an example TDD frame format 260 for signaling frame configuration information between TRPs using a dedicated connection (as opposed to using the more conventional X2 link). As shown in FIG. 2C, a guard period (GP) 265 in an S subframe 267 may be used in conjunction with the blanked beams to communicate the frame configuration information between TRPs, which may advantageously reuse the beamforming hardware since no data is transmitted at this time. The frame configuration information may include the chosen TDD frame configuration and one or more of the following:

a set of beam indices used;

an almost blank flag(s) bit; and a reschedule flag(s).

The frame configuration information may be transmitted in a first portion 270 of an overall mmWave band 275, which is allocated for backhaul/fronthaul use, while a second portion 280 is allocated for access, e.g., mmWave access where mmWave devices are able to receive or transmit using cellular-based techniques. The situation where a separate portion of the available bandwidth is dedicated for exchange of frame configuration information will be referred to as out of band signaling. In addition to or as an alternative to the reuse of bandwidth available in the blanked subframes, the backhaul X2 interface may be used to signal this control information.

FIG. 2C also illustrates out of band signaling (although still within overall band(s) 275) with any frame format (TDD and/or FDD (as shown in FIG. 2C)). Existing beamforming hardware may be reused in the GP of S subframes, such as S subframe 267, of TDD frames. Inband signaling (where a part of the bandwidth dedicated for other communications is used, e.g., using the second portion 280 to exchange frame configuration information) may also be used in the S subframes of TDD frames.

It is noted however, that a TRP to TRP link may operate in a more global cellular basis and not just be considered as a single link. Furthermore, future UE centric (cloud cell and virtual cell concepts) for ultra-dense networks (UDNs), a fast, high capacity, low latency TRP to TRP link may be required (e.g., a fronthaul and/or a backhaul), since user data may need to be transported (e.g., exchanged) from one TRP to another for a variety of reasons, including:

It is likely that not every TRP in a UE centric cell will have a dedicated connection to a switching gateway (via an S1 bearer). The switching gateway is a higher level network entity responsible for providing connectivity between TRPs. Many UE centric concepts propose that only a master TRP (or a head-node of a UE centric cell) will be connected to the switching gateway (via a wired or wireless connection) and the master TRP will distribute the user data to the other TRPs in the UE centric cell to support different communications modes.

As the UE moves through a group of TRPs, the set of TRPs for each UE centric cell will change in a very dynamic way and user data may need to be exchanged between TRPs to ensure that the user data is present for transmissions to the UE.

FIGS. 2A-2C are illustrations of techniques presented in co-assigned U.S. patent application Ser. No. 14/941,243.

According to an example embodiment, a high bandwidth, low latency link replaces or complements the current X2 link. The link may be referred to as either a backhaul or a fronthaul depending on the architecture of the communications system. The term backhaul will be used interchangeably with the term fronthaul although in some definitions they may be different. The link may utilize the spectrum at 6 GHz and above (e.g., the 15 GHz, 28 GHz, 38/39 GHz, 70-80 GHz, and so forth, spectrum bands) and the link shall be referred to as an mmWave backhaul of an mmWave communications system. A communications system operating at high frequencies will need to use beamforming to compensate for the high pathloss present at the high carrier frequencies. The backhaul link may be used for a cellular communications system where access (cellular-based connectivity) is operating below 6 GHz (e.g., 3GPP LTE-A compliant communications systems) or when access is also using the high carrier frequencies (at least in part).

FIG. 3A illustrates a bandwidth allocation diagram 300 of a frequency band used for a high frequency backhaul link where access uses a different frequency band. As shown in FIG. 3A, the entirety of the frequency band used for the high frequency backhaul link is usable by the high frequency backhaul link since access uses a different frequency band. FIG. 3B illustrates bandwidth allocation diagrams of a frequency band used for a high frequency backhaul link where access uses the same frequency band as the backhaul link. A first bandwidth allocation diagram 350 illustrates a situation wherein the high frequency band is shared between the backhaul link and access using frequency division multiple access (FDMA) and is partitioned into at least two portions, with a first high frequency portion is allocated to the backhaul link and a second high frequency portion allocated to the access. A second bandwidth allocation diagram 370 illustrates a situation wherein the frequency band is shared between the high frequency backhaul link and access using time division multiple access (TDMA) or spatial division multiple access (SDMA). If TDMA is used, the backhaul link is assigned to use the high frequency band at specific times and the access is assigned to use the high frequency band at other specific times. If SDMA is used, the high frequency backhaul link is assigned to use the frequency band only in specific spatial orientations (or beam directions) and the access is assigned to use the same frequency band in other specific spatial orientations (or beam directions), where the spatial orientations may change as a function of time.

According to an example embodiment, the high frequency backhaul link has the flexibility to change its data rate in different directions depending on the requirement of each TRP. Since each TRP may be serving UEs with different uplink and downlink ratios for access (by way of different chosen TDD frame structures for access, for example), the high frequency backhaul link may also need to change its own data rate to support the TRPs. As an illustrative example, if the uplink to downlink ratio is very small (i.e., uplink much smaller than downlink), the high frequency backhaul link changes its downlink data rate to allow for the transfer of more downlink data to the TRPs to meet TRP requirements.

According to an example embodiment, TDMA is used to multiplex the usage of the high frequency band between the high frequency backhaul link and access. Although the usage of the high frequency band could be multiplexed for the high frequency backhaul link and access by using FDMA, TDMA may be particularly attractive since the capacity between the high frequency backhaul link and access can be dynamically changed to meet demand, and this is generally easier with TDMA than with FDMA. With SDMA, sufficient isolation between access and the high frequency backhaul link may be difficult to guarantee for all deployments.

Figure 4A:
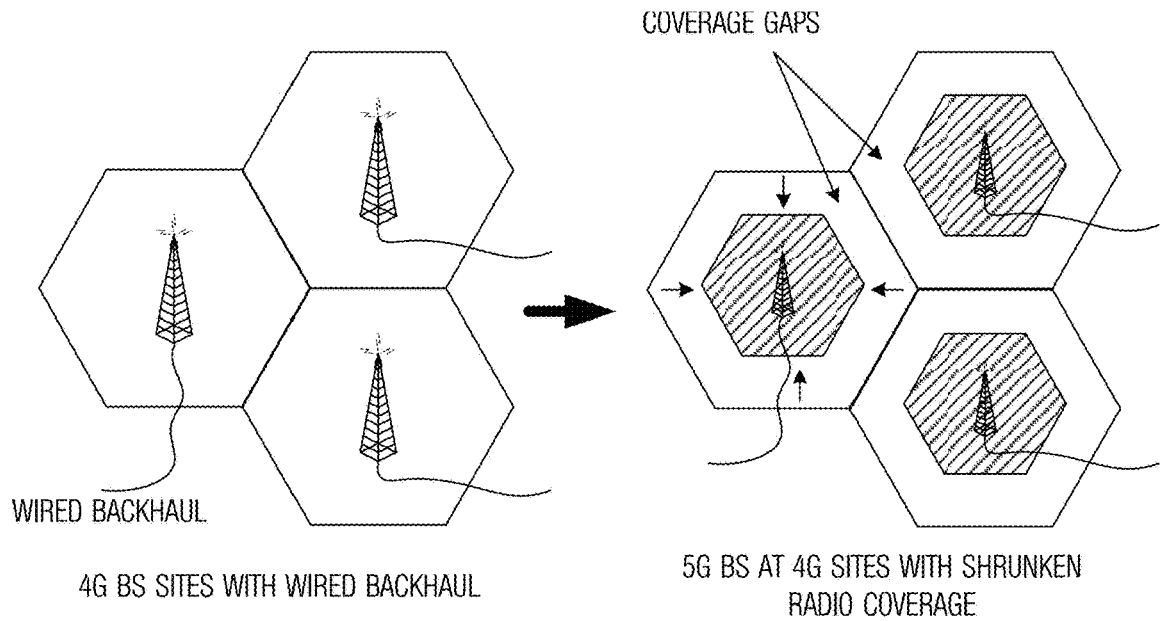
FIGS. 4A and 4B illustrate prior art techniques for multiplexing beam-formed mmWave fronthaul transmissions/receptions from a legacy base station (4G base stations) to and from a set of 5G small cells that are placed between the 4G base stations according to embodiments presented herein.
Figure 4B:
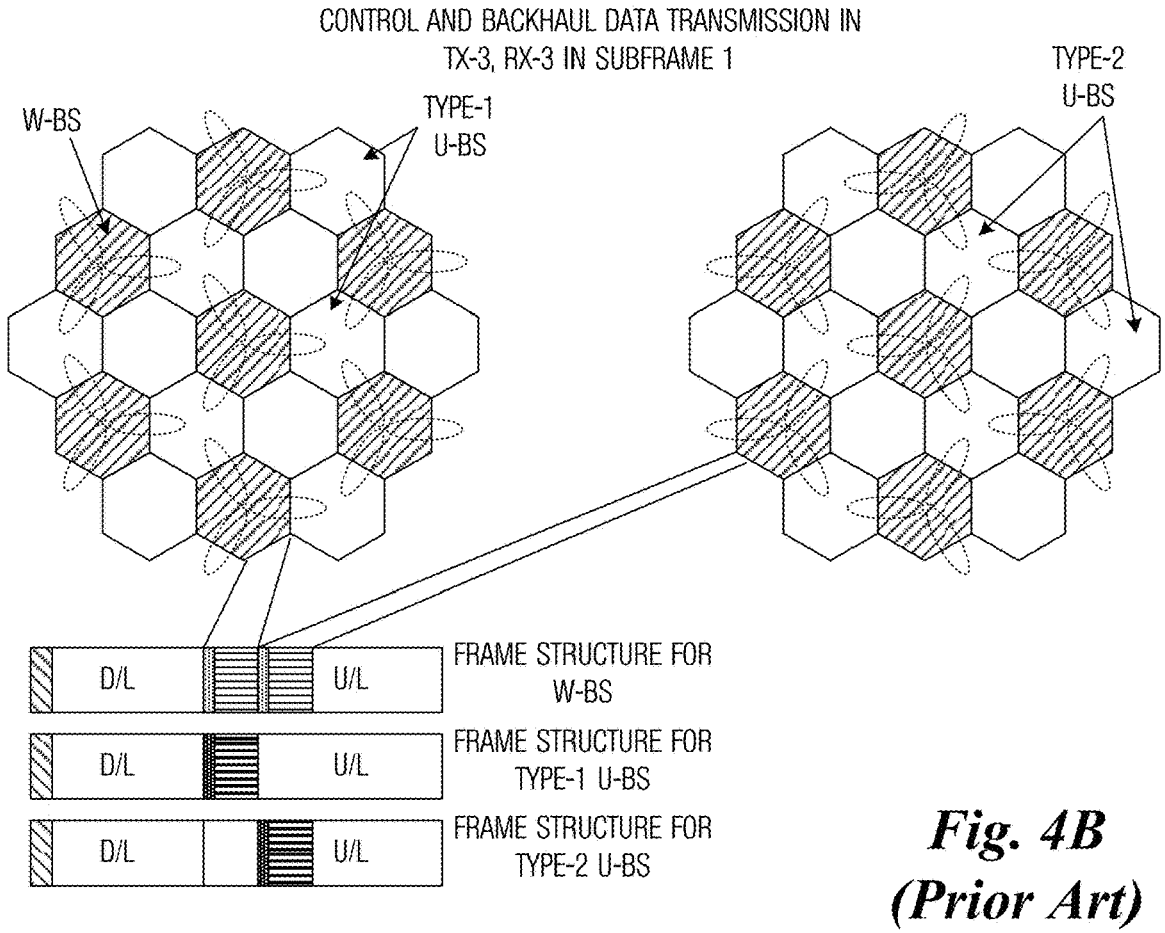

FIGS. 4A and 4B illustrate prior art techniques for multiplexing beamformed mmWave fronthaul transmissions/receptions from a legacy base station (4G base stations) to and from a set of 5G small cells that are placed between the 4G base stations. FIG. 4A is presented in R. Taori and A. Sridhanen, "Point-to-Multipoint In-Band mmWave Backhaul for 5G Networks", IEEE Communications Magazine, January 2015 and FIG. 4B is presented in US Patent publication number 2015/0036571 A1—"Transmission and scheduling for wireless front haul", both of which are hereby incorporated herein by reference. The 4G base stations have wired backhaul connections (labeled W-BS) and the 5G base stations (labeled U-BS) are placed between the wired 4G base stations. Techniques enabling each wired 4G base station to each 5G base station are presented. The prior art techniques disclose that each unwired 5G base station is connected to each wired 4G base station under certain deployment mixes of 4G and 5G base stations. As such, there is no accommodation for neighboring 5G TRPs (base stations) to have direct connections with each other. If neighboring 5G TRPs want to exchange information (control and/or data), the information would have to be relayed through the W-BS, which would lead to latency and capacity issues. As an example, because each TRP to TRP exchange has to be processed by the W-BS, latency corresponding to multiple frames and/or subframes as well as W-BS processing is incurred. As another example, each TRP to TRP exchange uses (and therefore are limited to) the capacity of the W-BS to U-BS link. Finally, the prior art techniques are not applicable to all possible deployments.

According to an example embodiment, a multiplexing scheme that supports a high frequency backhaul link from each TRP to all of its neighboring TRPs is provided, where the neighboring TRPs may or may not have connectivity to the switching gateway. At first glance, the problem looks relatively simple. A solution, such as proposed in the co-assigned U.S. patent application Ser. No. 14/941,243, where TDD transmissions across each cell edge may be used.

However, the solution does not address a situation where all TRPs have to communicate with each other instead of just one TRP communicating with other TRPs. Furthermore, a proposed solution should not require adjacent antenna arrays of a single TRP to be in transmit and receive modes at the same time to reduce cross interference.

According to an example embodiment, TDD techniques enabling high frequency backhaul links connecting a TRP to each of its neighbors are presented. The TDD techniques utilize as few subframes as possible to reduce latency.

According to an example embodiment, each TRP has an integer number of backhaul modes of operation for communicating on the high frequency backhaul link. Within each backhaul mode of operation, a TRP performs downlink transmissions or uplink receptions and not both downlink and uplink. Between backhaul modes of operation, a TRP can switch communications mode, e.g., from downlink to uplink or uplink to downlink, or remain in the same communications mode, e.g., downlink to downlink or uplink to uplink. Every TRP uses the same backhaul modes of operation, but different TRP types perform different backhaul modes in a given time period. The assignment of the backhaul modes is made based on TRP type, where TRP type may be assigned manually or algorithmically, for example. The TRPs sequentially cycle through the backhaul modes.

According to an example embodiment, each TRP has three (3) backhaul modes of operations for communicating on the high frequency backhaul link. In a first backhaul mode, the TRP communicates (sends or receives) with all of its neighboring TRPs using its full complement of communications beams. In a second backhaul mode, the TRP communicates (receives or sends) with a first set of its neighboring TRPs using a first set of its communications beams, and in a third backhaul mode, the TRP communicates (receives or sends) with a second set of its neighboring TRPs using a second set of its communications beams. A combination of the first set of neighboring TRPs and the second set of neighboring TRPs make up all of the neighboring TRPs. Additionally, the first set of neighboring TRPs and the second set of neighboring TRPs may be mutually exclusive. A combination of the first set of communications beams and the second set of communications beams make up the full complement of communications beams. Furthermore, the first set of communications beams and the second set of communications beams are mutually exclusive.

The TRP and its neighboring TRPs may switch backhaul modes on a subframe basis. Switching backhaul modes each subframe helps to reduce the latency associated with the high frequency backhaul link. Alternatively, the TRP and its neighboring TRPs may switch backhaul modes following a specified pattern of subframes. As an illustrative example, The TRP and its neighboring TRPs switches backhaul modes every N-th subframe, where N is equal to 1, 2, 3, 4, and so on. As another illustrative example, the TRP and its neighboring TRPs may remain in different backhaul modes for different numbers of subframes. The TRPs start at different backhaul modes, dependent upon each TRP's relationship to a starting TRP. A first TRP may start with the first backhaul mode as its initial mode, while some TRPs that are immediate neighbors of the first TRP (i.e., some first order neighbors) may start with the second backhaul mode as their initial mode, and other TRPs that are also first order neighbors (i.e., other closest neighbors) may start with the third backhaul mode as their initial mode, and so on. A scheduling algorithm may be used to determine initial backhaul modes for the TRPs of a communications system. Alternatively, the initial backhaul modes may be specified manually.

According to an example embodiment, a first backhaul mode comprises the TRP transmitting to all of its neighboring TRPs using its full complement of communications beams, a second backhaul mode comprises the TRP receiving from a first set of its neighboring TRPs using a first set of communications beams, and a third backhaul mode comprises the TRP receiving from a second set of its neighboring TRPs using a second set of communications beams. A combination of the first set of communications beams and the second set of communications beams make up the full complement of communications beams. Furthermore, the first set of communications beams and the second set of communications beams are mutually exclusive.

Figure 5A:
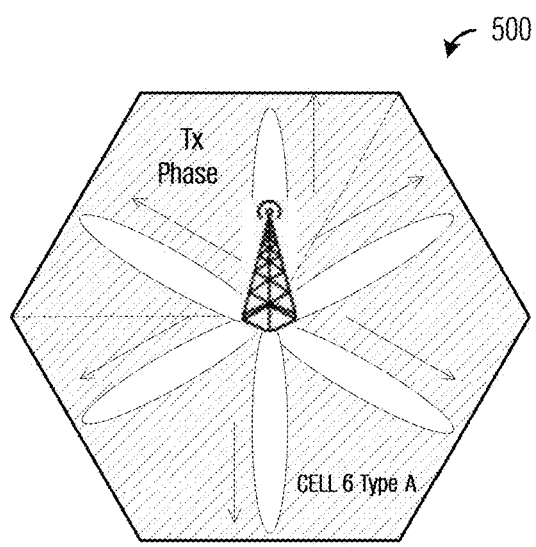
FIG. 5A illustrates a TRP and coverage area highlighting a first backhaul mode for the TRP where the TRP transmits using its full complement of communications beams according to embodiments presented herein.

FIG. 5A illustrates a TRP and coverage area 500 highlighting a first backhaul mode for the TRP where the TRP transmits using its full complement of communications beams. Transmitting using the full complement of communications beams, enables the TRP to transmit to all of its closest neighboring TRPs.

Figure 5B:
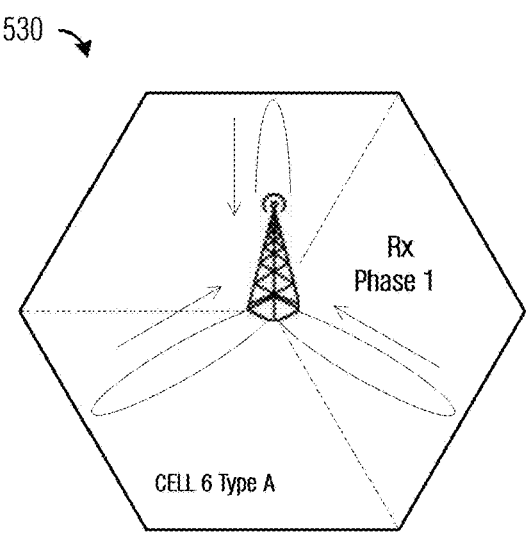
FIG. 5B illustrates a TRP and coverage area highlighting a second backhaul mode for the TRP where the TRP receives using a first set of communications beams according to embodiments presented herein.

FIG. 5B illustrates a TRP and coverage area 530 highlighting a second backhaul mode for the TRP where the TRP receives using a first set of communications beams. Receiving using the first set of communications beams, enables the TRP to receive from a first subset of its closest neighboring TRPs. As shown in FIG. 5B, the first set of communications beams comprises half of the TRP's full complement of communications beams, therefore, the TRP is able to receive from approximately half of its closest neighboring TRPs.

Figure 5C:
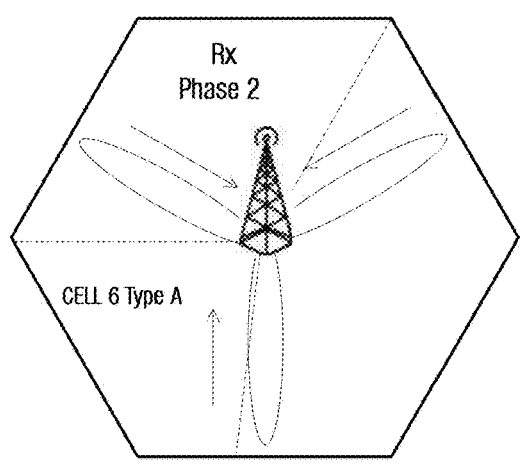
FIG. 5C illustrates a TRP and coverage area highlighting a third backhaul mode for the TRP where the TRP receives using a second set of communications beams according to embodiments presented herein.

FIG. 5C illustrates a TRP and coverage area 560 highlighting a third backhaul mode for the TRP where the TRP receives using a second set of communications beams. Receiving using the second set of communications beams, enables the TRP to receive from a second subset of its closest neighboring TRPs. The first set of communications beams shown in FIG. 5B and the second set of communications beams are mutually exclusive. As shown in FIG. 5C, the second set of communications beams comprises half of the TRP's full complement of communications beams, therefore, the TRP is able to receive from approximately half of its closest neighboring TRPs. Because the first set and the second set are mutually exclusive, between the second backhaul mode and the third backhaul mode, the TRP is able to receive from all of the closest neighboring TRPs.

Figure 6A:
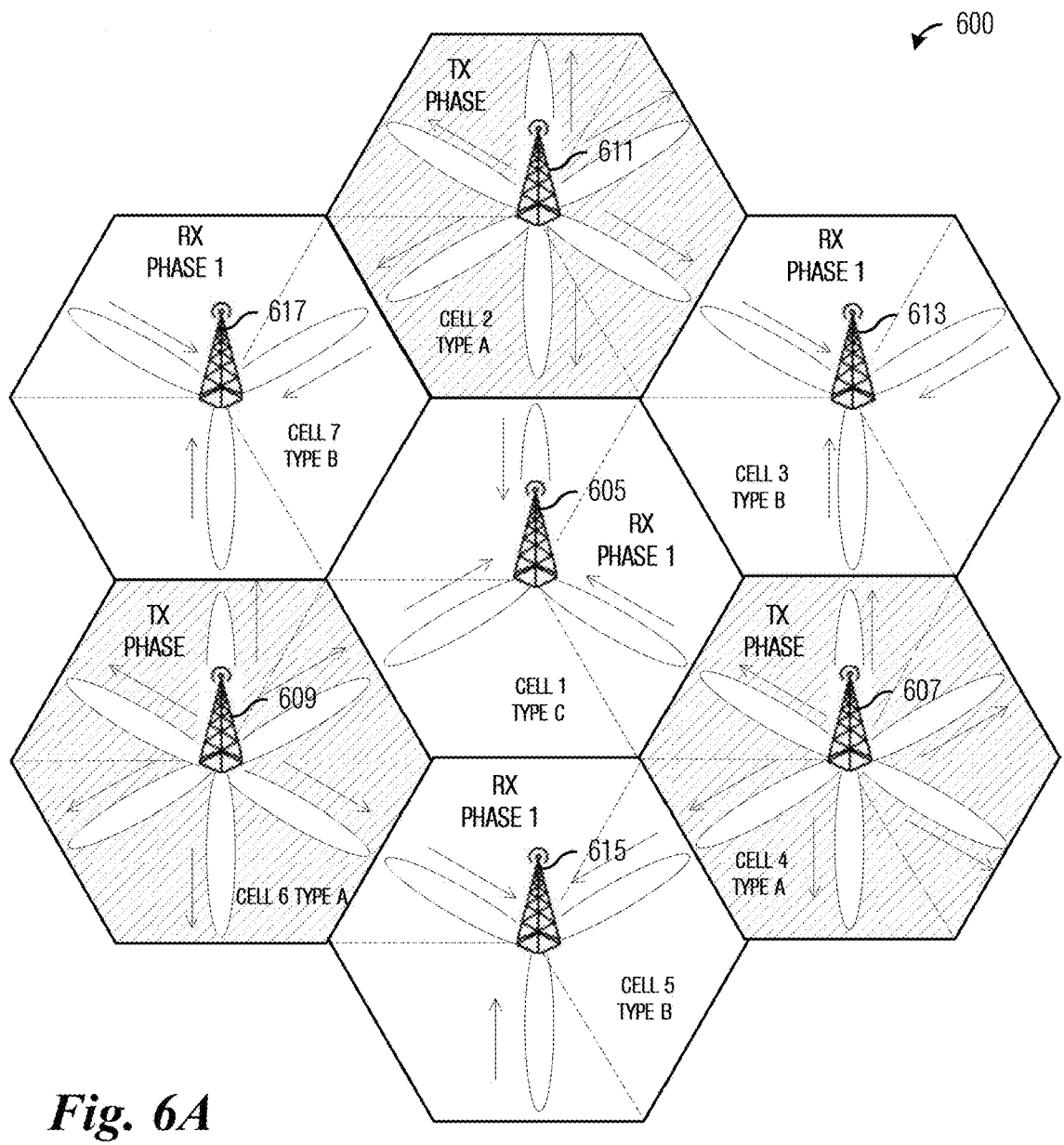
FIGS. 6A-6C illustrate diagrams of a portion of a communications system highlighting TRPs operating in different first example backhaul modes to facilitate a high frequency backhaul link according to embodiments presented herein.
Figure 6B:
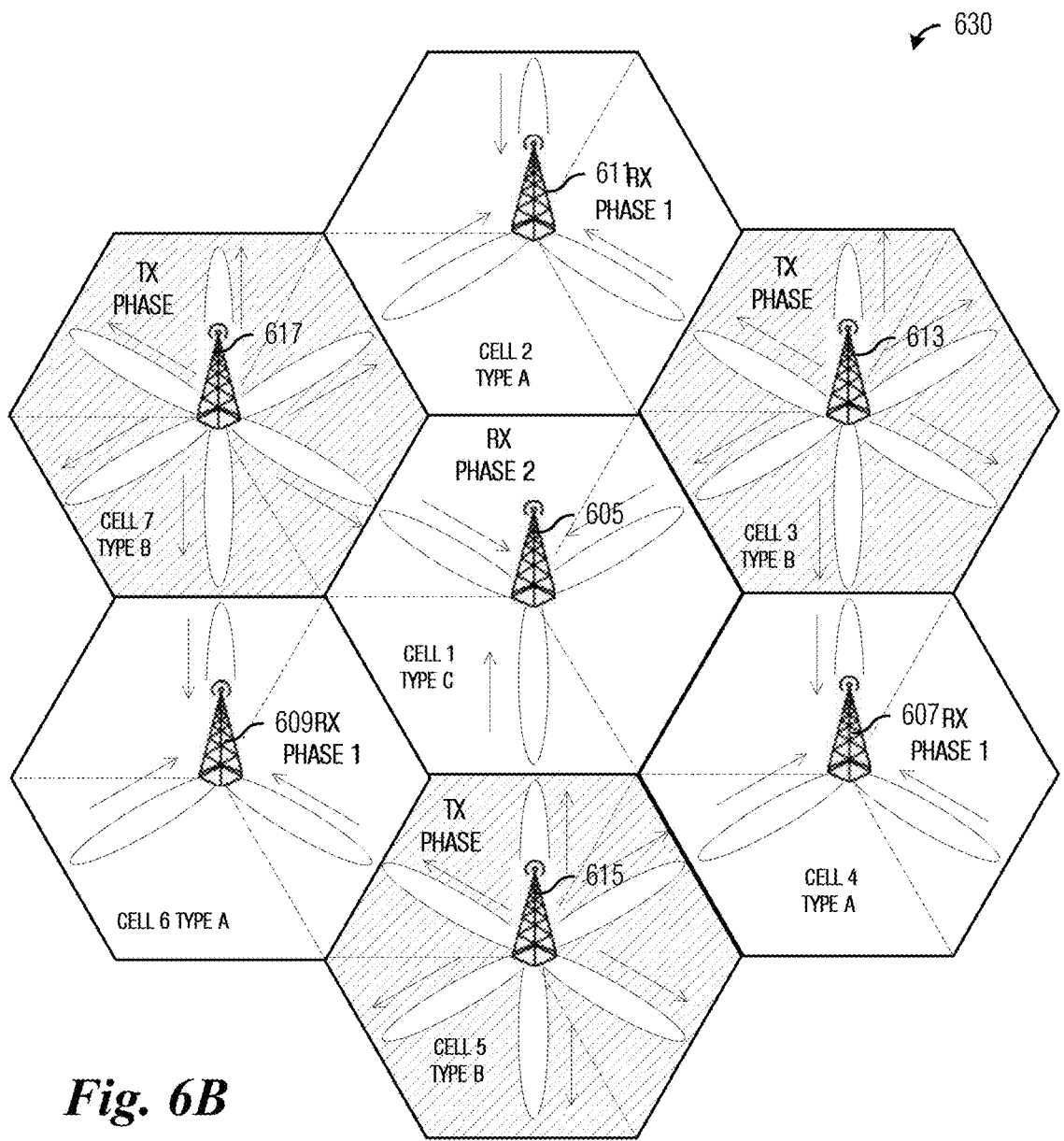
Figure 6C:
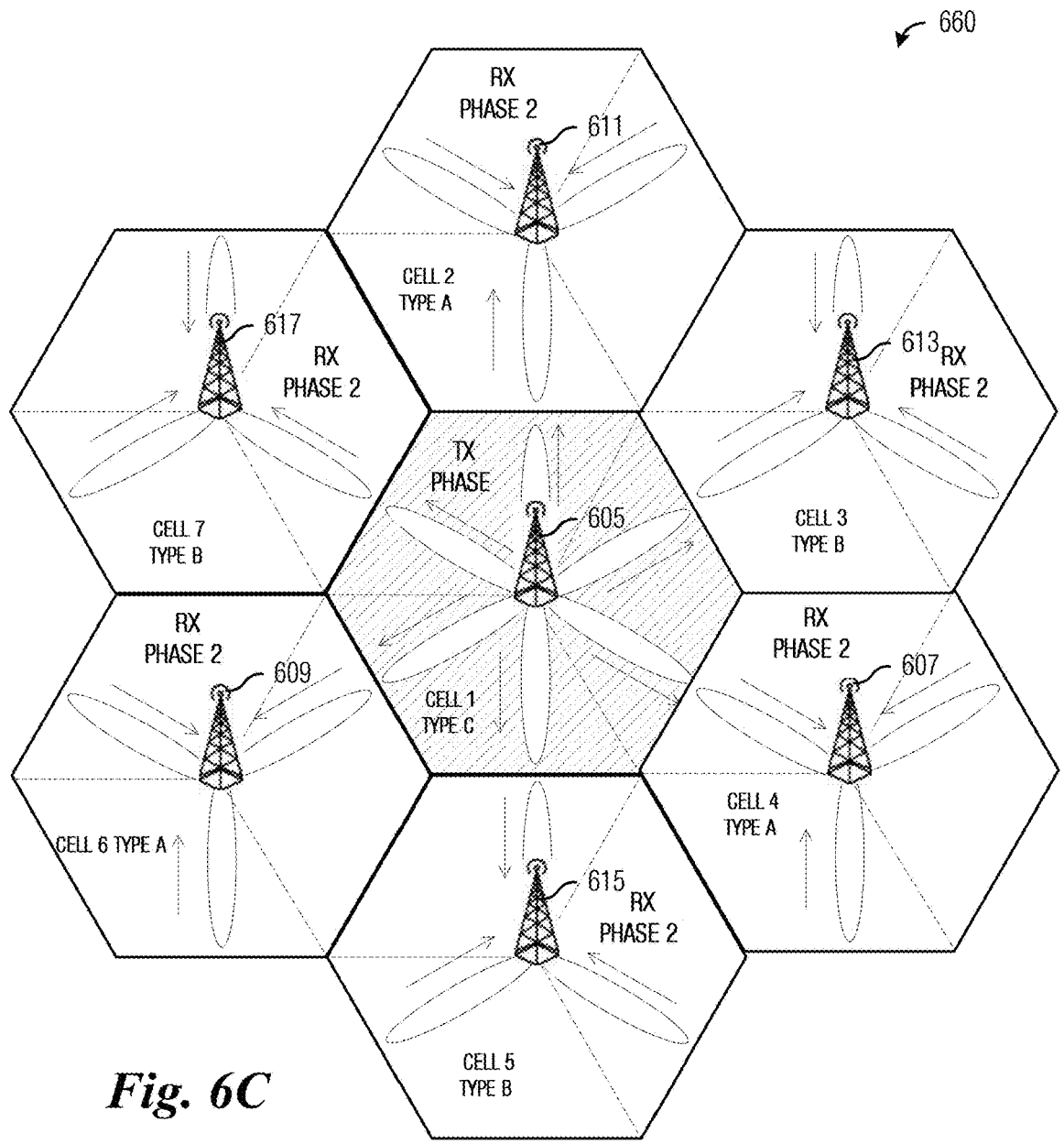
Figure 9E:
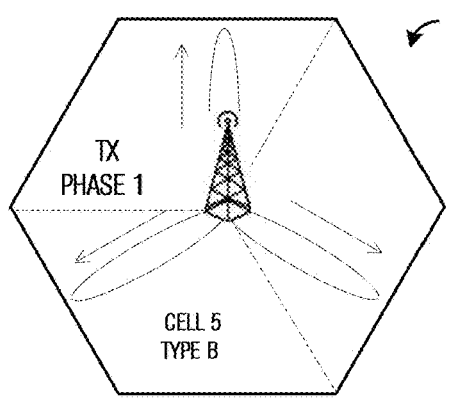
Figure 9F:
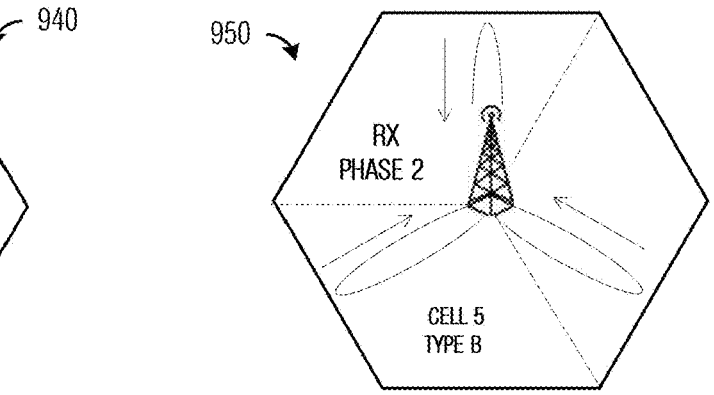

FIGS. 6A-6C illustrate diagrams of a portion of a communications system highlighting TRPs operating in different first example backhaul modes to facilitate a high frequency backhaul link. Within any given time period, the backhaul mode of a TRP is determined based on the position of the TRP relative to its neighboring TRPs. A scheduling algorithm may be used to determine the mode of the TRPs of the communications system. Alternatively, the modes of the TRPs of the communications system may be determined from a memory/database, a network entity, neighboring TRPs, or a combination thereof. Diagram 600 (FIG. 6A) illustrates the backhaul modes of the TRPs during a first time period. During the first time period, a first TRP 605 (labeled Type C) is set to operate in the second backhaul mode (receive using a first set of communications beams). A first subset of the neighboring TRPs (labeled Type A) of first TRP 605, e.g., second TRP 607, third TRP 609, and fourth TRP 611, are set to operate in the first backhaul mode (transmit using their full complement of communications beams) and a second subset of the neighboring TRPs (which are labeled Type B) of first TRP 605, e.g., fifth TRP 613, sixth TRP 615, and seventh TRP 617, are set to operate in the third backhaul mode (receive using a second set of communications beams). The backhaul modes of the TRPs during the first time period are referred to as the initial backhaul modes of the TRPs. It is noted that the initial backhaul modes of the TRPs shown in FIG. 6A are only examples presented for illustration and discussion. The initial backhaul modes may differ if the communications beams differ, the topology of the communications system differs, different implementation choices are made, different sets of communications beams, and so forth. Other initial backhaul modes are possible, as long as the relations between TRPs shown in FIG. 6A are maintained.

Diagram 630 (FIG. 6B) illustrates the backhaul modes of the TRPs during a second time period. During the second time period, first TRP 605 is set to operate in the third backhaul mode (receive using the second set of communications beams), while the first subset of neighboring TRPs of first TRP 605 (labeled Type A), e.g., second TRP 607, third TRP 609, and fourth TRP 611, are set to operate in the second backhaul mode (receive using the first set of communications beams) and a second subset of the neighboring TRPs of first TRP 605 (labeled Type B), e.g., fifth TRP 613, sixth TRP 615, and seventh TRP 617, are set to operate in the first backhaul mode (transmit using their full complement of communications beams). In other words, each TRP sequentially changes to the next backhaul mode. As an example, if a TRP was operating in the first backhaul mode in the first time period, in the second time period the TRP will operate in the second backhaul mode. Similarly, if a TRP was operating in the third backhaul mode in the first time period, in the second time period the TRP will operate in the first backhaul mode. The consistent cycling through of the different backhaul modes enables the TRPs to communicate without causing undue interference.

Diagram 660 (FIG. 6C) illustrates the backhaul modes of the TRPs during a third time period. During the third time period, first TRP 605 is set to operate in the first backhaul mode (transmit using their full complement of communications beams), while the first subset of neighboring TRPs of first TRP 605 (labeled Type A), e.g., second TRP 607, third TRP 609, and fourth TRP 611, are set to operate in the third backhaul mode (receive using the second set of communications beams) and a second subset of the neighboring TRPs of first TRP 605 (labeled type B), e.g., fifth TRP 613, sixth TRP 615, and seventh TRP 617, are set to operate in the second backhaul mode (receive using the first set of communications beams).

Table 1 illustrates example backhaul modes for different TRP types, with D representing downlink communications, and U representing uplink communications.

TABLE 1

Example backhaul modes.

| Cell Type | Sub-frame 1 | Sub-frame 2 | Sub-frame 3 |
|---|---|---|---|
| A | D (full) | U (mode 2) | U (mode 3) |
| B | U (mode 3) | D (full) | U (mode 2) |
| C | U (mode 2) | U (mode 3) | D (full) |

The subframes may be in a different time order, i.e., the information shown in Table 1 is just for discussion purposes. It is important that the backhaul modes are synchronized with TRP types as shown in the discussion. The information shown in Table 1 allows for one complete downlink and uplink transmission set per sector. Multiple downlinks and/or uplinks may be needed and may be dynamically assigned depending upon the chosen TDD frame structure. Further discussion of this is presented below. Unlike TDD for access (eNB to UE communications), the propagation delay between TRPs is known, so S subframes between the downlink and uplink subframes are not needed. The TRP to TRP delays may be incorporated into guard times, for example.

According to an example embodiment, a first backhaul mode comprises the TRP receiving from all of its neighboring TRPs using its full complement of communications beams, a second backhaul mode comprises the TRP transmitting to a first set of its neighboring TRPs using a first set of communications beams, and a third backhaul mode comprises the TRP transmitting to a second set of its neighboring TRPs using a second set of communications beams. A combination of the first set of neighboring TRPs and the second set of neighboring TRPs make up all of the neighboring TRPs. Additionally, the first set of neighboring TRPs and the second set of neighboring TRPs may be mutually exclusive. A combination of the first set of communications beams and the second set of communications beams make up the full complement of communications beams. Furthermore, the first set of communications beams and the second set of communications beams are mutually exclusive. This approach has some advantage over the previous approach as a TRP receiving using its full complement of communications beam and transmitting using only subsets of the full complement of communications beams, requires a lower number of power amplifiers (PAs) at the TRP, than if the TRP is transmitting using the full complement of communications beams.

Figure 7A:
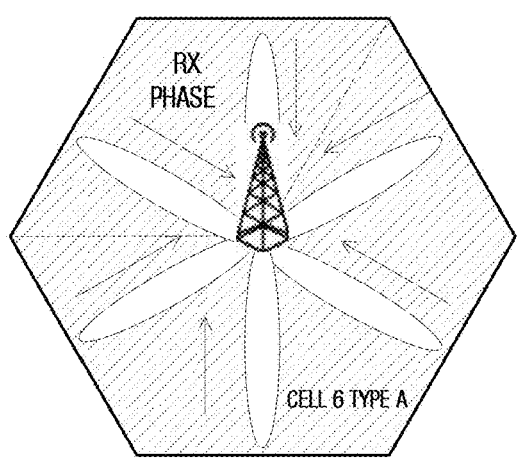
FIG. 7A illustrates a TRP and coverage area highlighting a first backhaul mode for the TRP where the TRP receives using its full complement of communications beams according to embodiments presented herein.

FIG. 7A illustrates a TRP and coverage area 700 highlighting a first backhaul mode for the TRP where the TRP receives using its full complement of communications beams. Receiving using the full complement of communications beams, enables the TRP to receive from all of its closest neighboring TRPs.

Figure 7B:
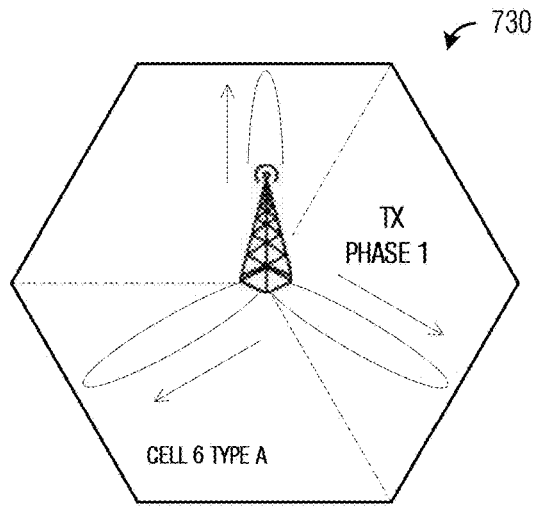
FIG. 7B illustrates a TRP and coverage area highlighting a second backhaul mode for the TRP where the TRP transmits using a first set of communications beams according to embodiments presented herein.

FIG. 7B illustrates a TRP and coverage area 730 highlighting a second backhaul mode for the TRP where the TRP transmits using a first set of communications beams. Transmitting using the first set of communications beams, enables the TRP to transmit to a first subset of its closest neighboring TRPs. As shown in FIG. 7B, the first set of communications beams comprises half of the TRP's full complement of communications beams, therefore, the TRP is able to transmit to approximately half of its closest neighboring TRPs.

Figure 7C:
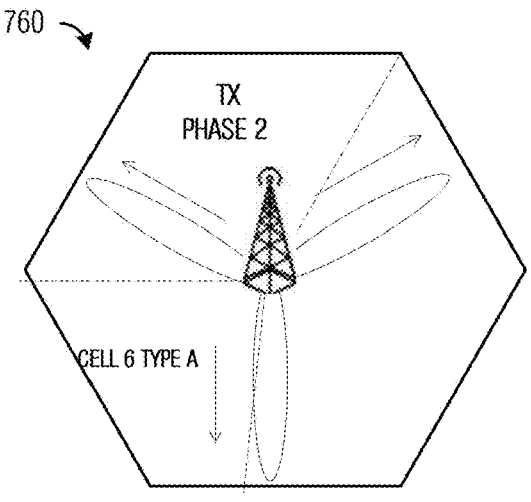
FIG. 7C illustrates a TRP and coverage area highlighting a third backhaul mode for the TRP where the TRP transmits using a second set of communications beams according to embodiments presented herein.

FIG. 7C illustrates a TRP and coverage area 760 highlighting a third backhaul mode for the TRP where the TRP transmits using a second set of communications beams. Transmitting using the second set of communications beams, enables the TRP to transmit to a second subset of its closest neighboring TRPs. The first set of communications beams and the second set of communications beams are mutually exclusive. As shown in FIG. 7C, the second set of communications beams comprises half of the TRP's full complement of communications beams, therefore, the TRP is able to transmit to half of its closest neighboring TRPs. Because the first set and the second set are mutually exclusive, between the second backhaul mode and the third backhaul mode, the TRP is able to transmit to all of its closest neighboring TRPs.

Figure 8A:
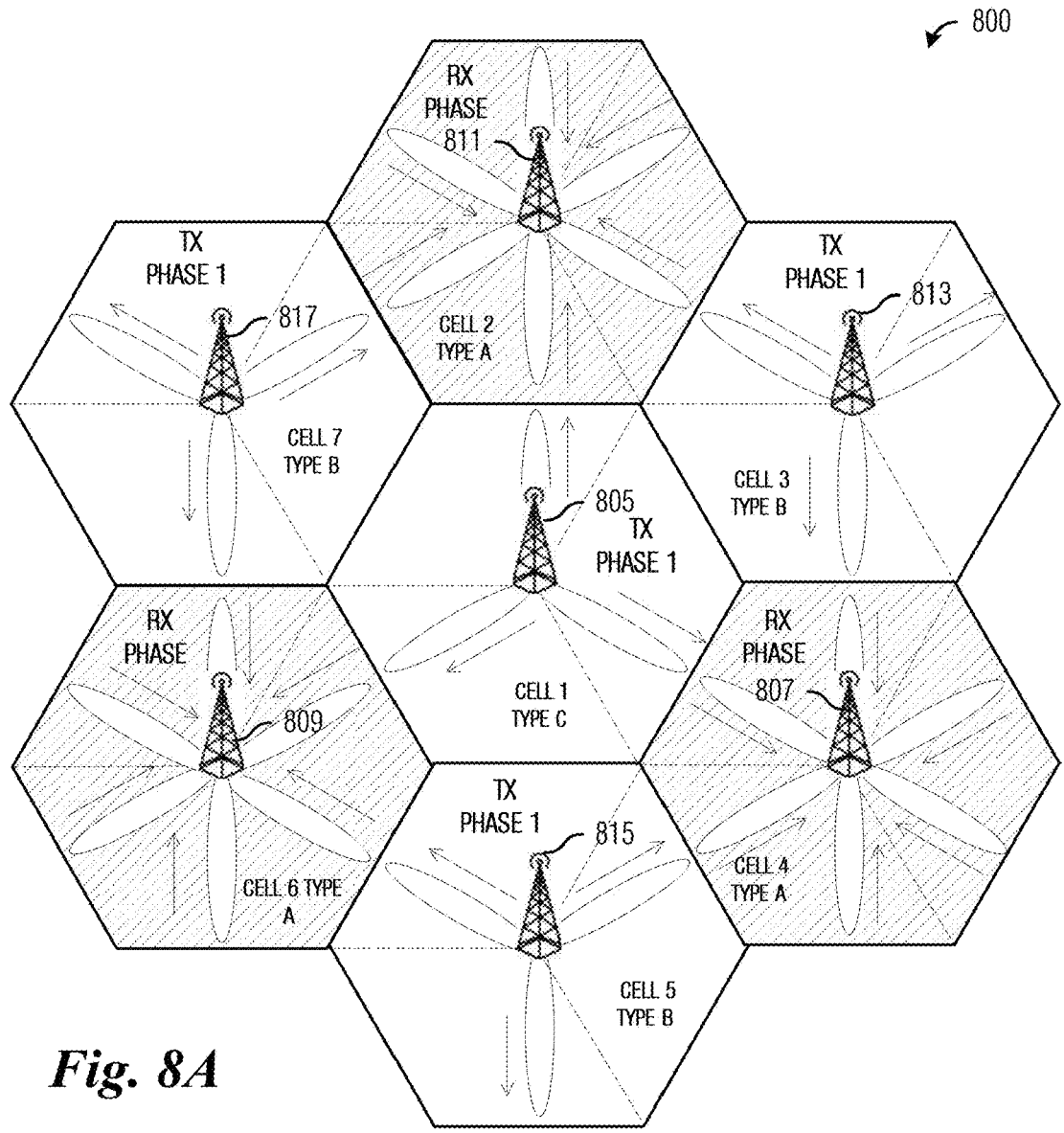
FIGS. 8A-8C illustrate diagrams of a portion of a communications system highlighting TRPs operating in different second example backhaul modes to facilitate a high frequency backhaul link according to embodiments presented herein.
Figure 9G:
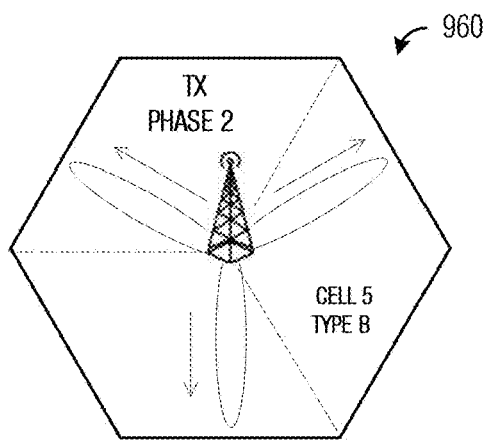
Figures 8B, 12:
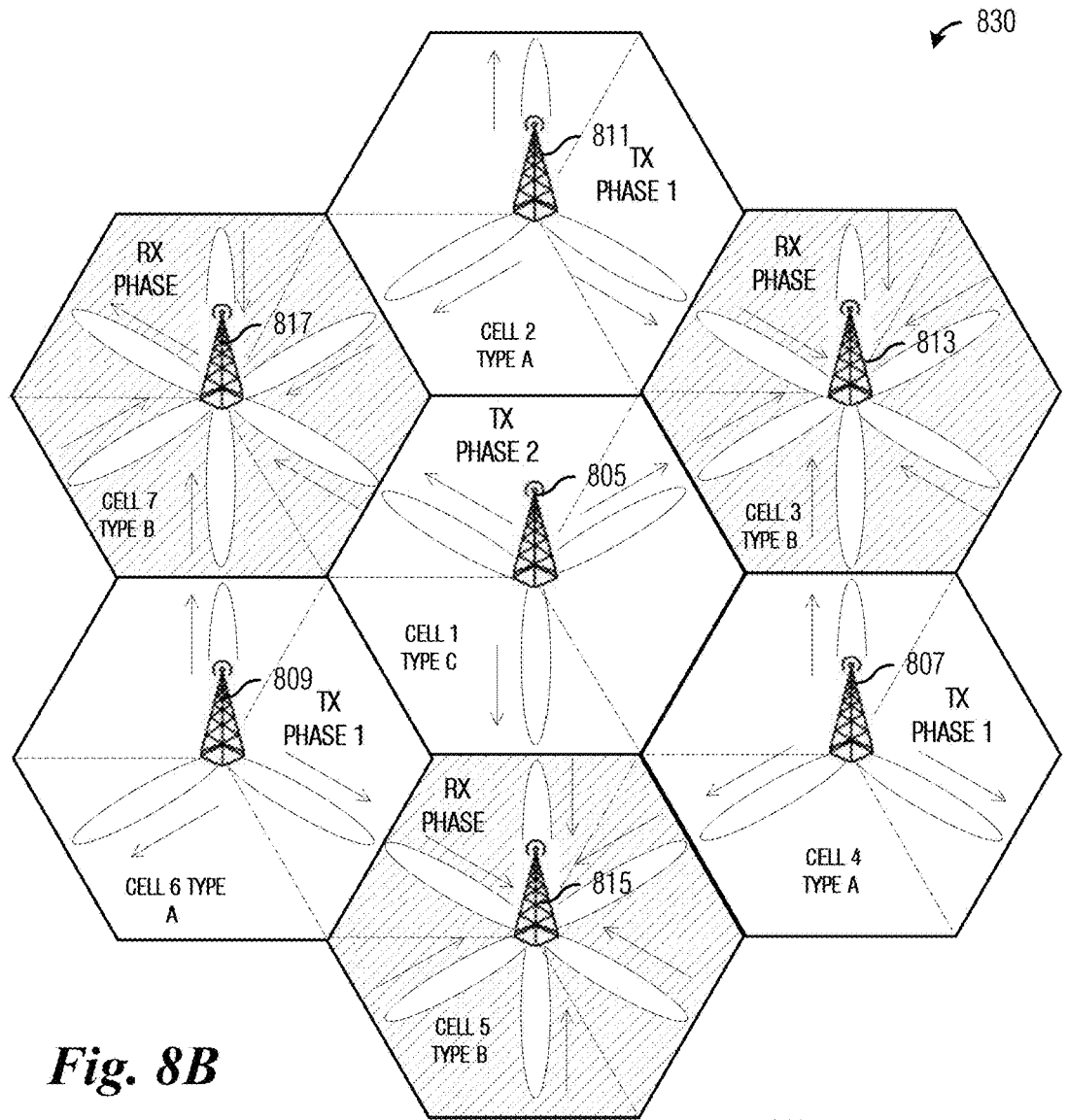
FIG. 12 illustrates TDD frame configurations for 3GPP LTE-A according to embodiments presented herein.
Figure 8C:
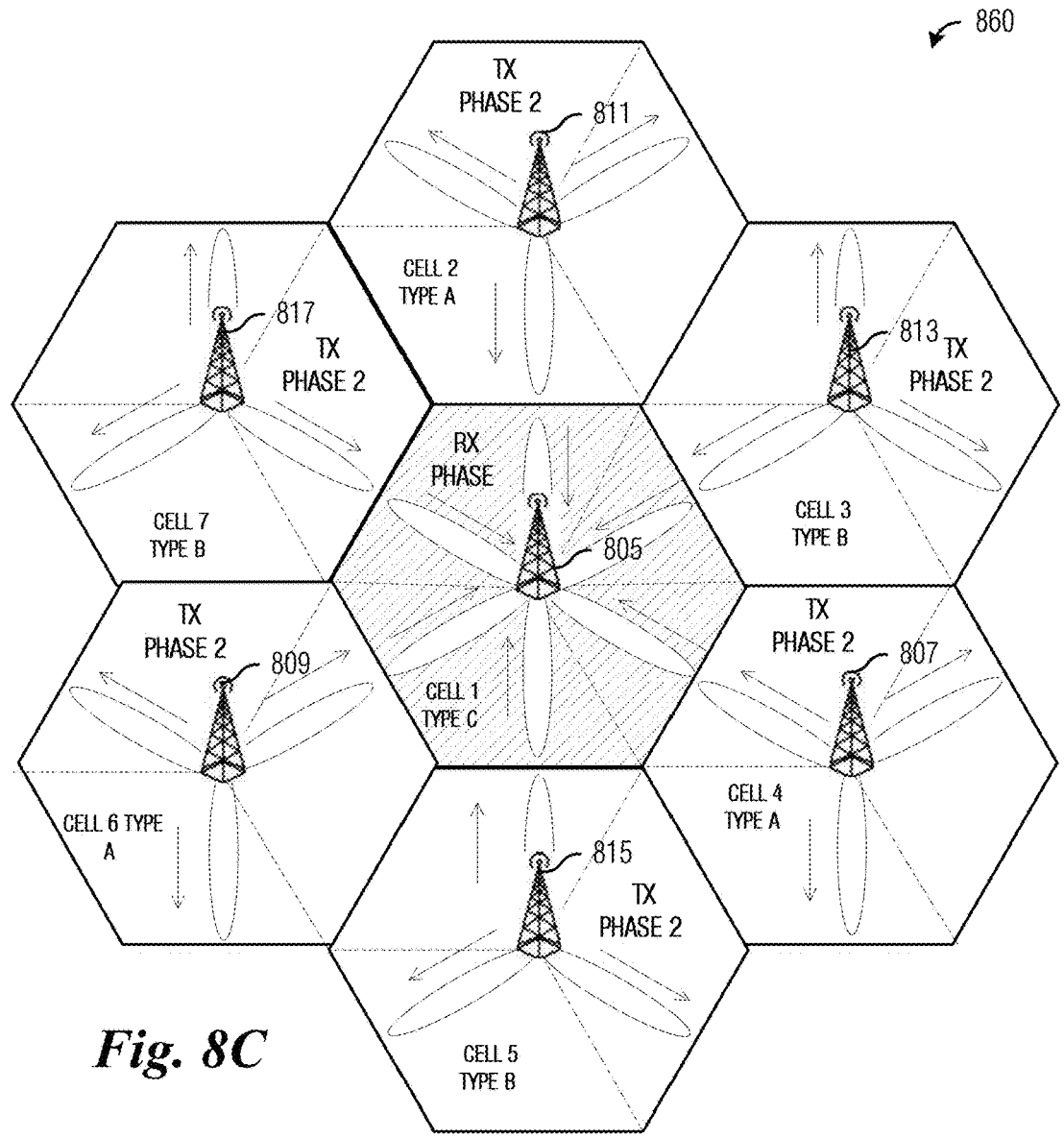

FIGS. 8A-8C illustrate diagrams of a portion of a communications system highlighting TRPs operating in different second example backhaul modes to facilitate a high frequency backhaul link. Within any given time period, the backhaul mode of a TRP may be determined based on the position of the TRP relative to its neighboring TRPs. A scheduling algorithm may be used to determine the mode of the TRPs of the communications system. Diagram 800 (FIG. 8A) illustrates the backhaul modes of the TRPs during a first time period. During the first time period, a first TRP 805 is set to operate in the second backhaul mode (transmit using a first set of communications beams). A first subset of the neighboring TRPs of first TRP 805 (labeled type A), e.g., second TRP 807, third TRP 809, and fourth TRP 811, are set to operate in the first backhaul mode (receive using their full complement of communications beams) and a second subset of the neighboring TRPs of first TRP 805 (labeled type B), e.g., fifth TRP 813, sixth TRP 815, and seventh TRP 817, are set to operate in the third backhaul mode (transmit using a second set of communications beams). The backhaul modes of the TRPs during the first time period are referred to as the initial backhaul modes of the TRPs. It is noted that the initial backhaul modes of the TRPs shown in FIG. 8A are only examples presented for illustration and discussion. The initial backhaul modes may differ if the communications beams differ, the topology of the communications system differs, different implementation choices are made, different sets of communications beams, and so forth. Other initial backhaul modes are possible, as long as the relations between TRPs shown in FIG. 8A are maintained.

Diagram 830 (FIG. 8B) illustrates the backhaul modes of the TRPs during a second time period. During the second time period, first TRP 805 is set to operate in the third backhaul mode (transmit using the second set of communications beams), while the first subset of neighboring TRPs of first TRP 805 (labeled type A), e.g., second TRP 807, third TRP 809, and fourth TRP 811, are set to operate in the second backhaul mode (transmit using the first set of communications beams) and a second subset of the neighboring TRPs of first TRP 805 (labeled Type B), e.g., fifth TRP 813, sixth TRP 815, and seventh TRP 817, are set to operate in the first backhaul mode (receive using their full complement of communications beams). In other words, each TRP sequentially changes to the next backhaul mode. As an example, if a TRP was operating in the first backhaul mode in the first time period, in the second time period the TRP will operate in the second backhaul mode. Similarly, if a TRP was operating in the third backhaul mode in the first time period, in the second time period the TRP will operate in the first backhaul mode. The consistent cycling through of the different backhaul modes enables the TRPs to communicate without causing undue interference.

Diagram 860 (FIG. 8C) illustrates the backhaul modes of the TRPs during a third time period. During the third time period, first TRP 805 is set to operate in the first backhaul mode (receive using their full complement of communications beams), while the first subset of neighboring TRPs of first TRP 805 (labeled Type A), e.g., second TRP 807, third TRP 809, and fourth TRP 811, are set to operate in the third backhaul mode (transit using the second set of communications beams) and a second subset of the neighboring TRPs of first TRP 805 (labeled Type B), e.g., fifth TRP 813, sixth TRP 815, and seventh TRP 817, are set to operate in the second backhaul mode (transmit using the first set of communications beams).

Table 2 illustrates example backhaul modes for different TRP types, with D representing downlink communications, and U representing uplink communications.

TABLE 2

Example backhaul modes for different TRP types.

| Cell Type | Sub-frame 1 | Sub-frame 2 | Sub-frame 3 |
| --- | --- | --- | --- |
| A | U (full) | D (mode 2) | D (mode 3) |
| B | D (mode 3) | U (full) | D (mode 2) |
| C | D (mode 2) | D (mode 3) | U (full) |

According to an example embodiment, some TRP types have different backhaul modes that are determined and assigned based on the TRP type as well as their individual beamforming capabilities, where at least some of the different TRP types cycle through different sets of backhaul modes. If there are differences in the number of modes per different set of backhaul modes, TRPs using the set of backhaul modes with fewer modes may remain idle after they have cycled through their respective set of backhaul modes to permit the other TRPs using the different sets of backhaul modes to complete their cycles. Although there are different sets of backhaul modes, all TRPs of a TRP type assigned to a set of backhaul modes will use the same set of backhaul modes. Furthermore, all TRPs cycle through the backhaul modes at the same rate. The use of different sets of backhaul modes for different TRPs permits the coordination of transmission and reception between TRPs without cross interference and can also enable implementation of the high frequency backhaul link for TRPs with different beamforming capability. As an example, some TRPs have larger numbers of communications beams in their respective complement of communications beams since some TRPs have different limits on the number of simultaneous transmissions or receptions beams that they are capable of performing.

Figure 9A:
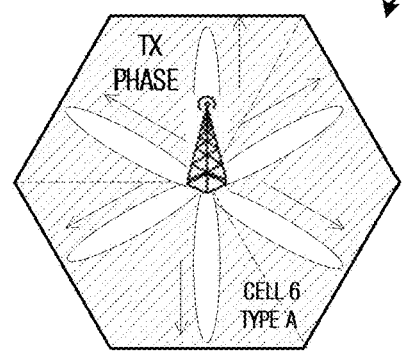
FIGS. 9A-9C illustrate diagrams of backhaul modes of a first set of backhaul modes for a first TRP type according to embodiments presented herein.
Figure 9B:
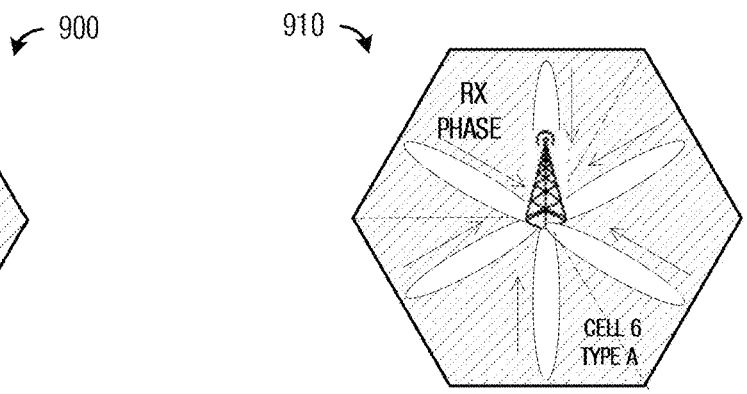
Figure 9C:
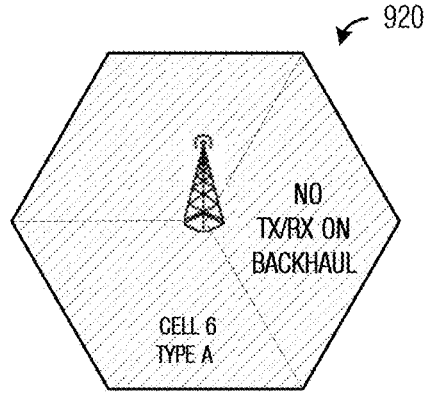
Figure 9D:
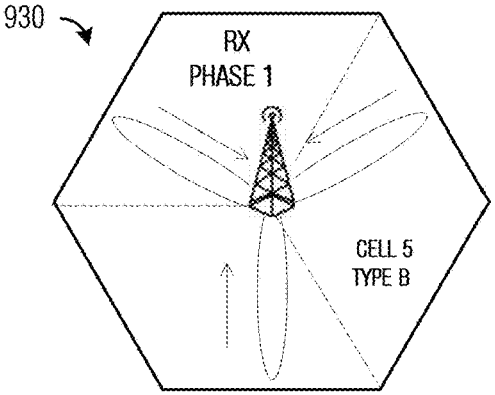
FIGS. 9D-9G illustrate diagrams backhaul modes of a second set of backhaul modes for second and third TRP types according to embodiments presented herein.

FIGS. 9A-9C illustrate diagrams of backhaul modes of a first set of backhaul modes for a first TRP type, e.g., type A TRPs. Type A TRPs are capable of sending and/or receiving on all communications beams simultaneously. Diagram 900 (FIG. 9A) illustrate a first backhaul mode of type A TRPs where a TRP transmits using its full complement of communications beams. Diagram 910 (FIG. 9B) illustrate a second backhaul mode of type A TRPs where the type A TRPs receive using their full complement of communications beams. Diagram 920 (FIG. 9C) illustrate a third backhaul mode of type A TRPs where the type A TRPs are idle, performing neither transmissions nor receptions on any of their communications beams.

FIGS. 9D-9G illustrate diagrams backhaul modes of a second set of backhaul modes for second and third TRP types, e.g., types B and C TRPs. Diagram 930 (FIG. 9D) illustrate a first backhaul mode of types B and C TRPs where a TRP receives using a first set of its complement of communications beams. Diagram 940 (FIG. 9E) illustrate a second backhaul mode of types B and C TRPs where a TRP transmits using a second set of its complement of communications beams. Diagram 950 (FIG. 9F) illustrate a third backhaul mode of types B and C TRPs where a TRP receives using a third set of its complement of communications beams. Diagram 960 (FIG. 9G) illustrate a fourth backhaul mode of types B and C TRPs where a TRP transmits using a fourth set of its complement of communications beams. It is noted that the configuration of sets of backhaul nodes and TRP types illustrated in FIGS. 9A-9G are for illustrative purposes only and are not meant to limit the scope or the spirit of the example embodiments.

The first set and the third set are mutually exclusive and when combined comprise the entirety of the full complement of communications beams. Similarly, the second set and the fourth set are mutually exclusive and when combined comprise the entirety of the full complement of communications beams.

FIGS. 10A-10D illustrate diagrams of a portion of a communications system highlighting TRPs operating in different example sets of backhaul modes to facilitate a high frequency backhaul link. Within any given time period, the backhaul mode of a TRP may be determined based on the position of the TRP relative to its neighboring TRPs. A scheduling algorithm may be used to determine the mode of the TRPs of the communications system, for example. The backhaul mode may also be determined based on the capabilities of the TRP. Diagram 1000 (FIG. 10A) illustrates the backhaul modes of the TRPs during a first time period. During the first time period, a first TRP 1005 (of Type C) is set to operate in the third backhaul mode of the second set of backhaul modes (receive using a second set of communications beams). A first subset of the neighboring TRPs of first TRP 1005 (Type B TRPs), e.g., second TRP 1007, third TRP 1009, and fourth TRP 1011, are set to operate in the first backhaul mode of the second set of backhaul modes (receive using a first set of communications beams) and a second subset of the neighboring TRPs of first TRP 1005 (Type A TRPs), e.g., fifth TRP 1013, sixth TRP 1015, and seventh TRP 1017, are set to operate in the first backhaul mode of the first set of backhaul modes (transmit using their full complement of communications beams). As discussed previously, the second subset of the neighboring TRPs of first TRP 1005, the Type A TRPs may be assigned different set of backhaul modes due to their capabilities, which may differ from the capabilities of the first subset of the neighboring TRPs of first TRP 1005 (Type B TRPs). It is noted that the configuration of sets of backhaul nodes and TRP types illustrated in FIGS. 10A-10D are for illustrative purposes only and are not meant to limit the scope or the spirit of the example embodiments.

Diagram 1030 (FIG. 10B) illustrates the backhaul modes of the TRPs during a second time period. During the second time period, first TRP 1005 is set to operate in the first backhaul mode of the second set of backhaul modes (receive using the first set of communications beams). A first subset of neighboring TRPs of first TRP 1005 (Type B TRPs), e.g., second TRP 1007, third TRP 1009, and fourth TRP 1011, are set to operate in the second backhaul mode of the second set of backhaul modes (transmit using the second set of communications beams) and the second subset of the neighboring TRPs of first TRP 1005, e.g., fifth TRP 1013, sixth TRP 1015, and seventh TRP 1017, are set to operate in the third backhaul mode of the first set of backhaul modes (the TRPs go silent, neither transmit nor receive).

Diagram 1050 (FIG. 10C) illustrates the backhaul modes of the TRPs during a third time period. During the third time period, first TRP 1005 (Type B TRPs) is set to operate in the fourth backhaul mode of the second set of backhaul modes (transmit using the first set of communications beams). A first subset of neighboring TRPs of first TRP 1005, e.g., second TRP 1007, third TRP 1009, and fourth TRP 1011, are set to operate in the third backhaul mode of the second set of backhaul modes (receive using the second set of communications beams) and the second subset of the neighboring TRPs of first TRP 1005, e.g., fifth TRP 1013, sixth TRP 1015, and seventh TRP 1017, are set to operate in the third backhaul mode of the first set of backhaul modes (the TRPs go silent, neither transmit nor receive).

Diagram 1070 (FIG. 10D) illustrates the backhaul modes of the TRPs during a fourth time period. During the fourth time period, first TRP 1005 is set to operate in the second backhaul mode of the second set of backhaul modes (transmit using the second set of communications beams). A first subset of neighboring TRPs of first TRP 1005, e.g., second TRP 1007, third TRP 1009, and fourth TRP 1011, are set to operate in the fourth backhaul mode of the second set of backhaul modes (transmit using the first set of communications beams) and the second subset of the neighboring TRPs of first TRP 1005, e.g., fifth TRP 1013, sixth TRP 1015, and seventh TRP 1017, are set to operate in the second backhaul mode of the first set of backhaul modes (receive using their full complement of communications beams).

Table 3 illustrates example backhaul modes for different TRP types, with X representing no communications, D representing downlink communications, and U representing uplink communications.

TABLE 3

Example backhaul times for different TRP types.

| Cell Type | Sub-frame 1 | Sub-frame 2 | Sub-frame 3 | Sub-frame 4 |
|---|---|---|---|---|
| A | D full (mode A1) | X (mode A3) | X (mode A3) | U full (mode A2) |
| B | U partial (mode 1) | D partial (mode 2) | U partial (mode 3) | D partial (mode 4) |
| C | U partial (mode 3) | U partial (mode 1) | D partial (mode 4) | D partial (mode 2) |

As with the previously discussed example embodiments, the time ordering of the subframes is unimportant, only the backhaul modes for the TRPs are synchronized with their neighboring TRPs. A different time order of the subframes (e.g., 1, 4, 2, and 3) may allow for TRP type A to use subframes 2 and 3 for access since no backhaul beamforming is needed in subframes 2 and 3 for TRP type A.

According to an example embodiment, TDD subframes used for the high frequency backhaul link are time multiplexed (using TDMA) with TDD subframes used for access. Even if the spectrum is split using FDMA, the radio frequency (RF) beamforming chains at the TRPs may be time shared between the high frequency backhaul link and the access to reduce complexity and cost. According to an example embodiment, in order to time multiplex the TDD subframes used for the high frequency backhaul link (as generated in accordance with any of the example embodiments regarding backhaul modes presented herein) with the TDD subframes used for access, the common portions of the TDD subframes used for access are used. Table 4 illustrates TDD frame configurations for 3GPP LTE-A. The subframes labeled "S" (subframe 1) are common for all TDD frame configurations. According to an alternative example embodiment, the TDD subframes used for the high frequency backhaul link are inserted between TDD subframes used for access.

TABLE 4

TDD frame configurations for 3GPP LTE-A.

| Uplink-Downlink Configuration | Downlink to Uplink Switch Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 11:
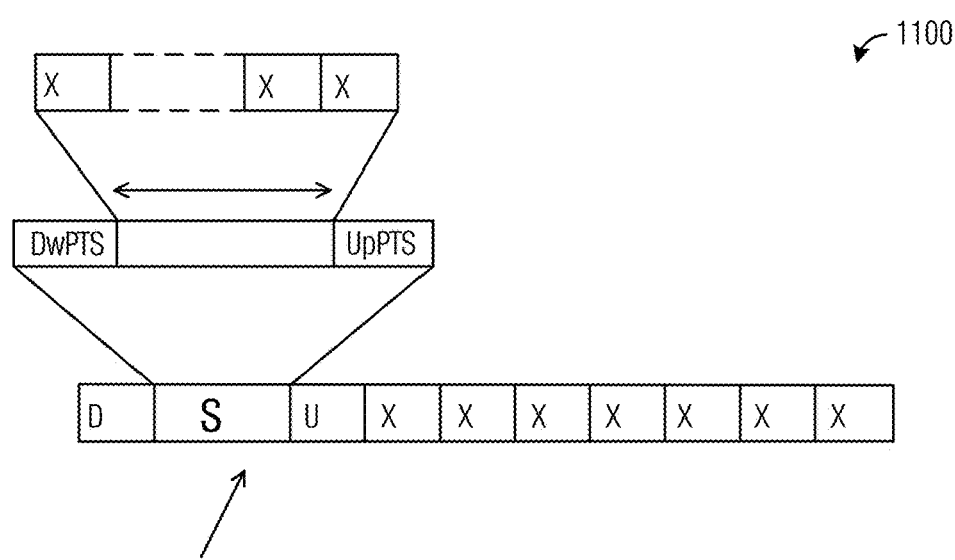
FIG. 11 illustrates an example frame structure with an extended subframe used to carry the TDD subframes for high frequency backhaul link support according to embodiments presented herein.

According to an example embodiment, the duration of a subframe used for access to carry the TDD subframes for high frequency backhaul link support is extended to accommodate TDD subframes used for high frequency backhaul link support. Extending the access subframe may be needed to provide adequate bandwidth. FIG. 11 illustrates an example frame structure 1100 with an extended subframe in the access frame, which is used to carry the TDD subframes for high frequency backhaul link support. In order to communicate at least one complete downlink and uplink subframe for the high frequency backhaul link, the extended access subframe used to carry these backhaul subframes must be able to carry at least one (1) subframe per backhaul mode. Therefore, to support the example embodiments shown in FIGS. 5 through 8, extension to support at least 3 subframes is needed, while to support the example embodiment shown in FIGS. 9 through 10, an extension to support at least 4 subframes is needed. It is noted that the extension may be greater than the minimum number of subframes to support additional high frequency backhaul link information. Furthermore, the TDD frame format of the backhaul sub-frames and the duration of the extended subframe may vary dynamically to support dynamically varying data rates in different directions between TRPs. Alternatively, one complete downlink or uplink TDD subframe for high frequency backhaul link may be supported. However, complete high frequency backhaul link information may not be conveyed in its entirety.

It is noted that because the high frequency backhaul link between TRPs will use a fixed communications beam direction (since the TRPs are generally stationary) as opposed to variable communications beam directions used for the access, the beam-width of the communications beams used for the high frequency backhaul link may be substantially narrower than those used for the access, thereby resulting in higher signal to noise ratios (SNRs), which in turn facilitates the use of higher level modulation schemes for the high frequency backhaul link (e.g., 256 QAM) than for the access (e.g., 16 QAM). Additionally, because the TRPs are generally stationary, lower sounding overhead is needed for the high frequency backhaul link than for the access. Hence, on a per subframe basis, the high frequency backhaul link can achieve much higher data rates than the access link, on the order of 2 to 2.5 times faster. The greater data rates means that even when a TRP has selected a TDD frame configuration for the access which has many downlink subframes (D) (e.g., frame format 5) or uplink subframes (U) (e.g., frame format 0), much fewer subframes are needed to support the high frequency backhaul link for all UE data in each frame. FIG. 12 illustrates TDD frame configurations 1200 for 3GPP LTE-A, highlighting frame format 0 and frame format 5. As shown in FIG. 12, frame format 0 has more U subframes than D subframes (6 U vs 2 D), while frame format 5 has more D subframes than U subframes (8 D vs 1 U). Even with such subframe imbalances, the higher data rates achievable in the high frequency backhaul link results in a requirement of fewer high frequency backhaul link subframes to support the data rates supported in the access link.

In communications systems where the access link and the high frequency backhaul link operate at different frequencies (e.g., the configuration shown in FIG. 3A), the difference in the numerologies of the different links (i.e., 3GPP LTE at 3 GHz for the access link and mmWave at 30 GHz for the high frequency backhaul link may result in subframe duration differences on the order of 10 times) and the difference in the operating frequencies may mean that the two frame structures may be entirely independent. It may be advantageous to make the timing between the two different frame structures consistent to simplify implementation and to make the user data for the access link be available by way of the high frequency backhaul link in a timely manner. As an example, subframes for the high frequency backhaul link should occur with sufficient frequency to ensure that the user data is transferred between TRPs before it is needed.

Figure 13:
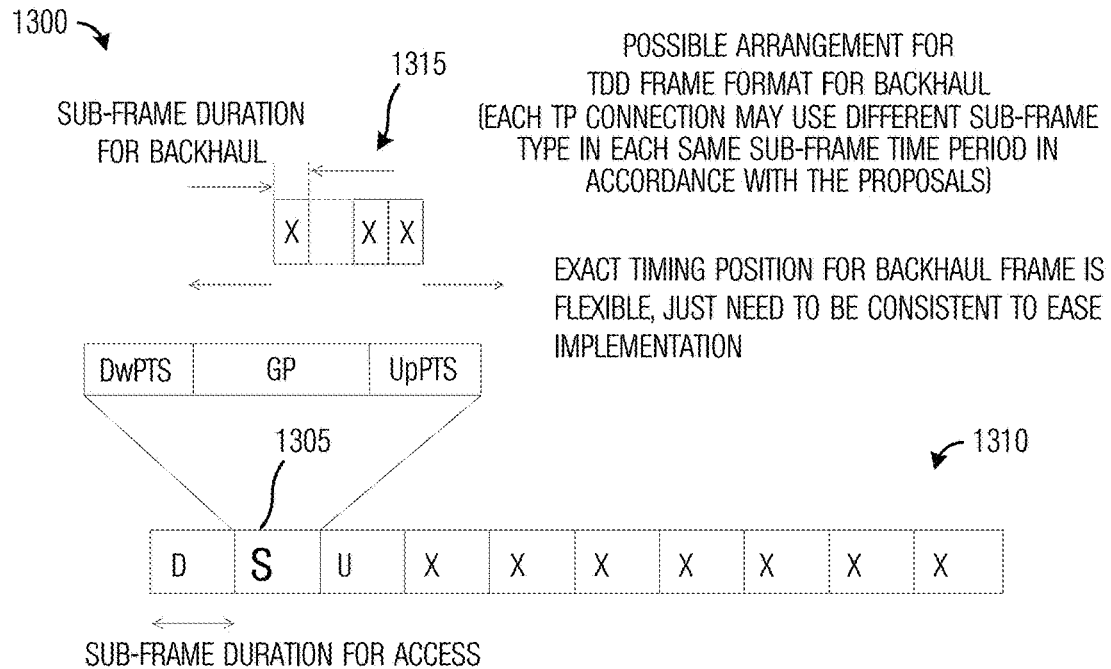
FIG. 13 illustrates an example TDD frame format for supporting the high frequency backhaul link according to embodiments presented herein.

FIG. 13 illustrates an example TDD frame format 1300 for supporting the high frequency backhaul link. FIG. 13 provides a detail view of S subframe 1305, which includes a downlink pilot time slot (DwPTS), a GP, and an uplink pilot time slot (UpPTS), of an access frame 1310. FIG. 13 also displays a frame 1315 for the high frequency backhaul link. A variety of different TDD frame formats are available and each TRP connection may use a different subframe time period to meet their respective data rate requirements. Furthermore, the exact timing position of frames of the high speed backhaul link is flexible. However, consistency in the timing may make implementation simpler.

Coverage areas with consistent shapes (hexagonal coverage areas) and consistent sizes (all TRPs having the same sized coverage areas) have been used to present the general principle of the different communications beam multiplexing techniques. However, in a real-world deployment, the coverage areas for the TRPs will not all be the same shape and/or size. In general, the coverage area of each TRP will have some arbitrary shape and size that is dependent upon the terrain and propagation conditions. Additionally, each TRP may not have exactly 6 neighbor TRPs.

Figure 14:
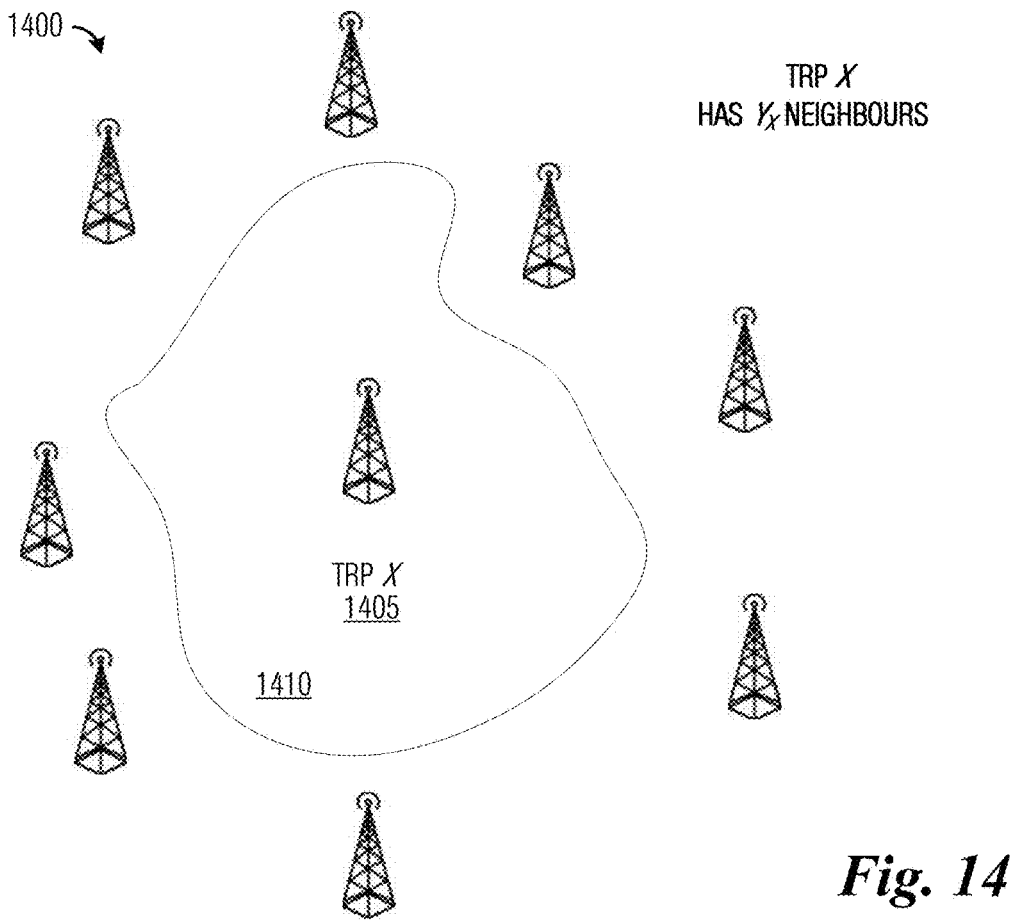
FIG. 14 illustrates a generalized communications system according to embodiments presented herein.

FIG. 14 illustrates a generalized communications system 1400. Communications system 1400 includes a TRP X 1405 with an associated coverage area 1410. The shape of coverage area 1410 may depend upon the terrain (e.g., large structures or geographical features blocking signals, wide open space allowing clear signal propagation, and so on) and propagation conditions. TRP X 1405 has Yx neighboring TRPs. The number of neighboring TRPs depending upon the location of TRP X 1405 with respect to communications system 1400 (e.g., system center, system edge, and so on), the density of users, the presence or lack of interference, and so forth.

According to an example embodiment, in a generalized communications system, each TRP has an integer number of backhaul modes of operation for communicating on the high frequency backhaul link. Within each backhaul mode of operation, a TRP performs downlink transmissions or uplink receptions and not both downlink and uplink. Between backhaul modes of operation, a TRP can either switch communications mode, e.g., from downlink to uplink or uplink to downlink, or remain in the same communications mode, e.g., downlink to downlink or uplink to uplink. Every TRP uses the same backhaul modes of operation, but different TRP types perform different backhaul modes in a given time period. The assignment of the backhaul modes is made based on TRP type, where TRP type may be assigned using a scheduling algorithm, for example. The TRPs sequentially cycle through the backhaul modes.

According to an example embodiment, in a generalized communications system, each TRP has 3 backhaul modes of operations for communicating on the high frequency backhaul link. In a first backhaul mode, the TRP communicates (sends or receives) with all of its neighboring TRPs using its full complement of communications beams. In a second backhaul mode, the TRP communicates (receives or sends) with a first set of its neighboring TRPs using a first set of its communications beams, and in a third backhaul mode, the TRP communicates (receives or sends) with its neighboring TRPs using a second set of its communications beams. The second and third backhaul modes may be referred to as partial modes since they involve communications with a portion of the neighboring TRPs. A combination of the first set of communications beams and the second set of communications beams make up the full complement of communications beams. Furthermore, the first set of communications beams and the second set of communications beams may be mutually exclusive. It is noted that there may be more than 3 backhaul modes with more than 2 partial modes. However, the more than 2 partial modes, when combined, will cover all of the neighboring TRPs.

According to an example embodiment, in a generalized communications system, a first backhaul mode comprises a TRP X transmitting to all of its neighboring TRPs using its full complement of communications beams, a second backhaul mode comprises the TRP X receiving from a first set of its neighboring TRPs on a first set of communications beams, and a third backhaul mode comprises the TRP X receiving from a second set of its neighboring TRPs on a second set of communications beams. The first set and the second set of neighboring TRPs make up all of the neighboring TRPs of TRP X and may be mutually exclusive. The first set and the second set of neighboring TRPs may be unequal in size, for example, if there is an odd number of neighboring TRPs. The first set and the second set of communications beams make up the full complement of communications beams of TRP X and may be mutually exclusive. The assignment of the TRPs may be static, semi-static, or dynamical in nature. The corresponding number of subframes required may be dependent on actual deployment.

According to an example embodiment, in a generalized communications system, a first backhaul mode comprises a TRP X receiving from all of its neighboring TRPs using its full complement of communications beams, a second backhaul mode comprises the TRP X transmitting to a first set of its neighboring TRPs on a first set of communications beams, and a third backhaul mode comprises the TRP X transmitting to a second set of its neighboring TRPs on a second set of communications beams. The first set and the second set of neighboring TRPs make up all of the neighboring TRPs of TRP X and may be mutually exclusive. The first set and the second set of neighboring TRPs may be unequal in size, for example, if there is an odd number of neighboring TRPs or if the neighboring TRPs are not evenly distributed. The first set and the second set of communications beams make up the full complement of communications beams of TRP X and may be mutually exclusive.

According to an example embodiment, in a generalized communications system, some TRP types have different backhaul modes that are determined and assigned based on the TRP type as well as their individual beamforming capabilities, where at least some of the different TRP types cycle through different sets of backhaul modes. If there are differences in the number of modes per different set of backhaul modes, TRPs using the set of backhaul modes with fewer modes may remain idle after they have cycled through their respective set of backhaul modes to permit the other TRPs using the different sets of backhaul modes to complete their cycles. Although there are different sets of backhaul modes, all TRPs of a TRP type assigned to a set of backhaul modes will use the same set of backhaul modes. Furthermore, all TRPs cycle through the backhaul modes at the same rate. The use of different sets of backhaul modes permits the implementation of the high frequency backhaul link for TRPs with different beamforming capability. As an example, some TRPs have larger numbers of communications beams in their respective complement of communications beams. As another example, some TRPs have different limits on the number of simultaneous transmissions or receptions that they are capable of performing.

According to an example embodiment, in a generalized communications system, a first type of TRP is assigned a set of 3 backhaul modes and more than one second types of TRP are assigned a set of 4 backhaul modes. The set of 3 backhaul modes may include a first backhaul mode where a TRP transmits to all of its neighboring TRPs using its full complement of communications beams, a second backhaul mode where the TRP receives from all of its neighboring TRP using its full complement of communications beams, and a third backhaul mode where the TRP remains idle. The set of 4 backhaul modes may include a first backhaul mode where a TRP transmits to a first set of neighboring TRPs using a first set of communications beams, a second backhaul mode where the TRP receives from a first set of neighboring TRPs using a first set of communications beams, a third backhaul mode where the TRP transmits to a second set of communications beams, and a fourth backhaul mode where the TRP receives from a second set of neighboring TRPs using a second set of communications beams. It is noted that some implementations may include greater numbers of partial modes.

The assignment of which TRPs will be in which backhaul mode for each subframe of the TDD backhaul frame may depend upon the deployment, as well as how the neighboring TRPs are located in space. Examples with regular deployments in a hexagonal communications system are discussed above. The backhaul mode to subframe mapping for each TRP may be performed as part of a TDD backhaul frame configuration.

The mapping may be performed statically during network planning. Each TRP may be assigned a TRP specific TDD backhaul frame configuration with the respective backhaul modes. The configuration may be stored and later retrieved from memory or database.

The mapping may be performed semi-statically. A newly deployed TRP may perform a beam sweep to find all of its neighboring TRPs and their respective identifiers. The newly deployed TRP may report to a TDD backhaul frame configuration entity, the report may include identifiers of the neighboring TRPs (and optionally, beam indices of the newly deployed TRP associated with each of the neighboring TRPs, e.g., beam directions), this is referred to as neighbor list reporting; and beamforming capability of the newly deployed TRP, this is referred to as TRP capability reporting. The newly deployed TRP receives TRP specific TDD backhaul frame configuration with associated backhaul modes from the TDD backhaul frame configuration entity. The TDD backhaul frame configuration entity may be a network entity dedicated to configuration or it may be collocated with an existing network entity.

The mapping may be performed dynamically (i.e., at a greater frequency than semi-static). A network controlling entity may dynamically inform each TRP of its TRP specific TDD backhaul frame structure. The information provided by the network controlling entity may be based upon a chosen TDD frame for the access for each TRP; and/or an updated neighbor list reports from each TRP, which may be useful when the TRPs are turned on or off for special events (concerts, sports, conventions, etc.), turned on or off due to load, or when a TRP is non-stationary (vehicles, buses, trains, etc.).

Communications between the network controlling entity and each TRP to semi-statically or dynamically assign the TDD backhaul frame structure to each TRP may occur over a dedicated TRP to network controlling entity connection (may be either wired or wireless). This connection may be simple to implement when an mmWave backhaul is used to complement a regular X2 interface. It is noted that only low data rates are needed for the connection.

Figure 15:
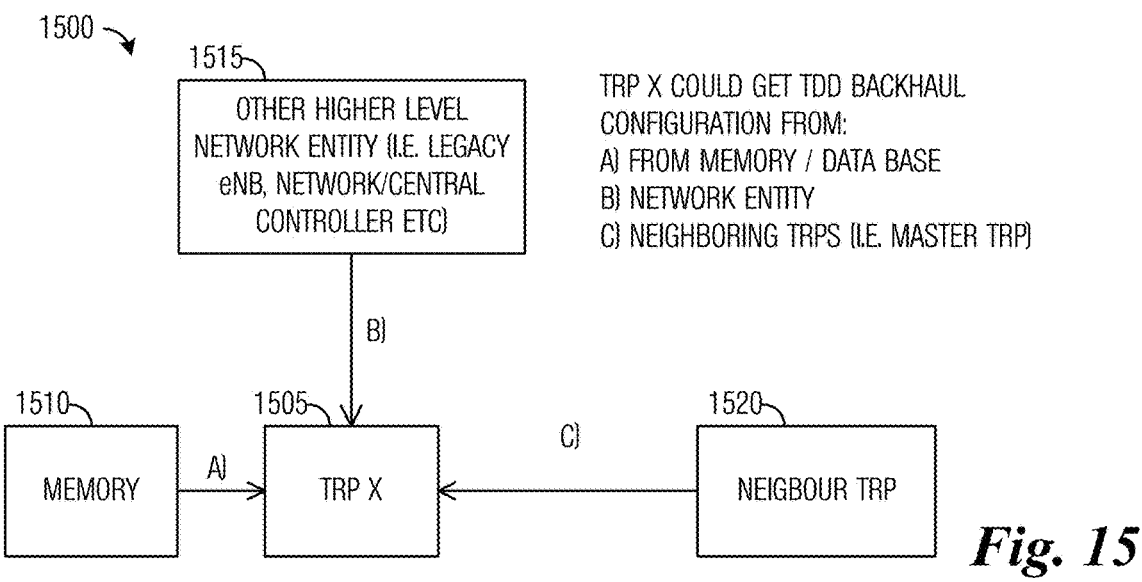
FIG. 15 illustrates example ways for a TRP to obtain TDD backhaul frame configurations according to embodiments presented herein.
Figure 10A:
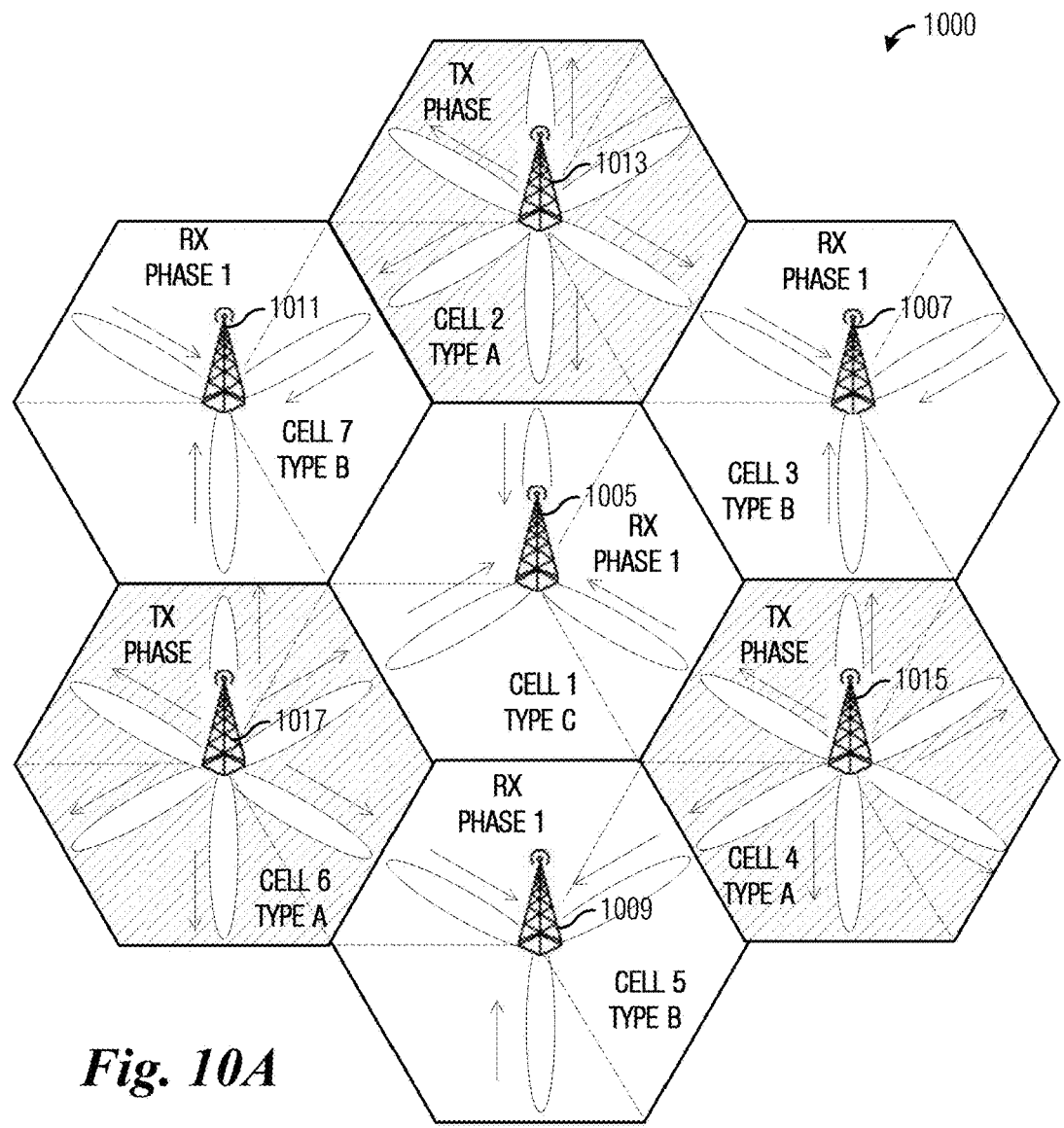
FIGS. 10A-10D illustrate diagrams of a portion of a communications system highlighting TRPs operating in different example sets of backhaul modes to facilitate a high frequency backhaul link according to embodiments presented herein.

FIG. 15 illustrates example ways 1500 for a TRP to obtain TDD backhaul frame configurations. TRP X 1505 may obtain the TDD backhaul frame configuration from a memory 1510, a network entity 1515, or from a neighboring TRP 1520 (such as a master TRP).

As an illustrative example, parameters of the TDD backhaul frame configuration includes at least one of the following:

TDD frame format index: this option assumes a fixed set of available formats (i.e., 2, 4, 8, 12, 16, and so on) and incurs very low overhead;
Alternatively, a frame length (in subframes, for example) may be specified for each access frame and mode (1, 2, 3, and so forth) or subframe type (downlink-full, uplink-full, downlink-partial, uplink-partial, and so on) for each subframe in the TDD backhaul frame;
Indices of the TRPs (or angular directions) for the full subframes;
Indices of the TRPs (or directions) for the separate partial subframes or modes.

Figure 16A:
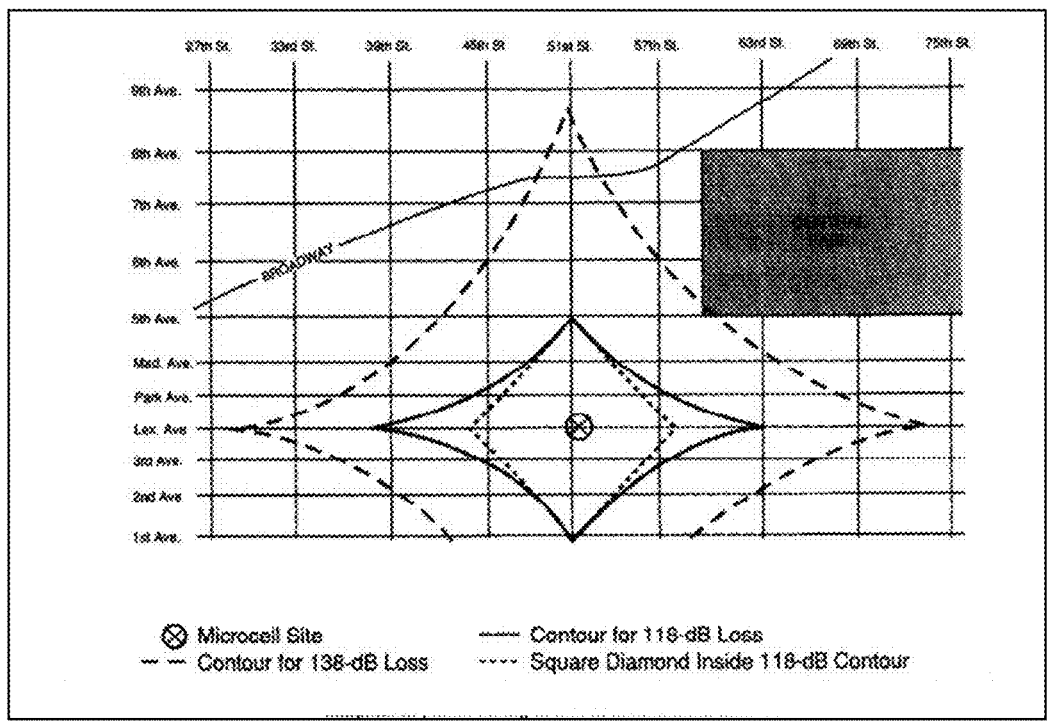
FIGS. 16A and 16B illustrate example deployments for urban areas according to embodiments presented herein.
Figure 16B:
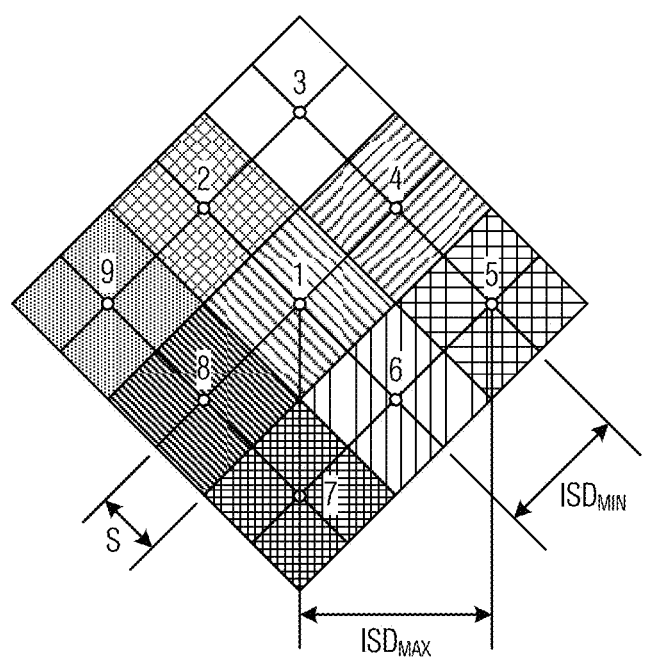

FIGS. 16A and 16B illustrate example deployments for urban areas. FIG. 16A is presented in A. Goldsmith et al, "A Measurement-based Model for Predicting Coverage Areas of Urban Microcells," IEEE Journal on Sel. Areas in Communications, Vol. 11, No. 7, September 1993, pp. 1013-11023, which is hereby incorporated herein by reference and illustrates signal power level of a rectangular urban deployment. FIG. 16B is presented in 3GPP RAN 1 WG 1 Meeting #84-R1 160924, "Diamond Shaped Cell Layouts for Above 6 GHz Channel Modeling", which is hereby incorporated herein by reference and illustrates a diamond shaped urban deployment with 9 sites.

Figures 17, 18:
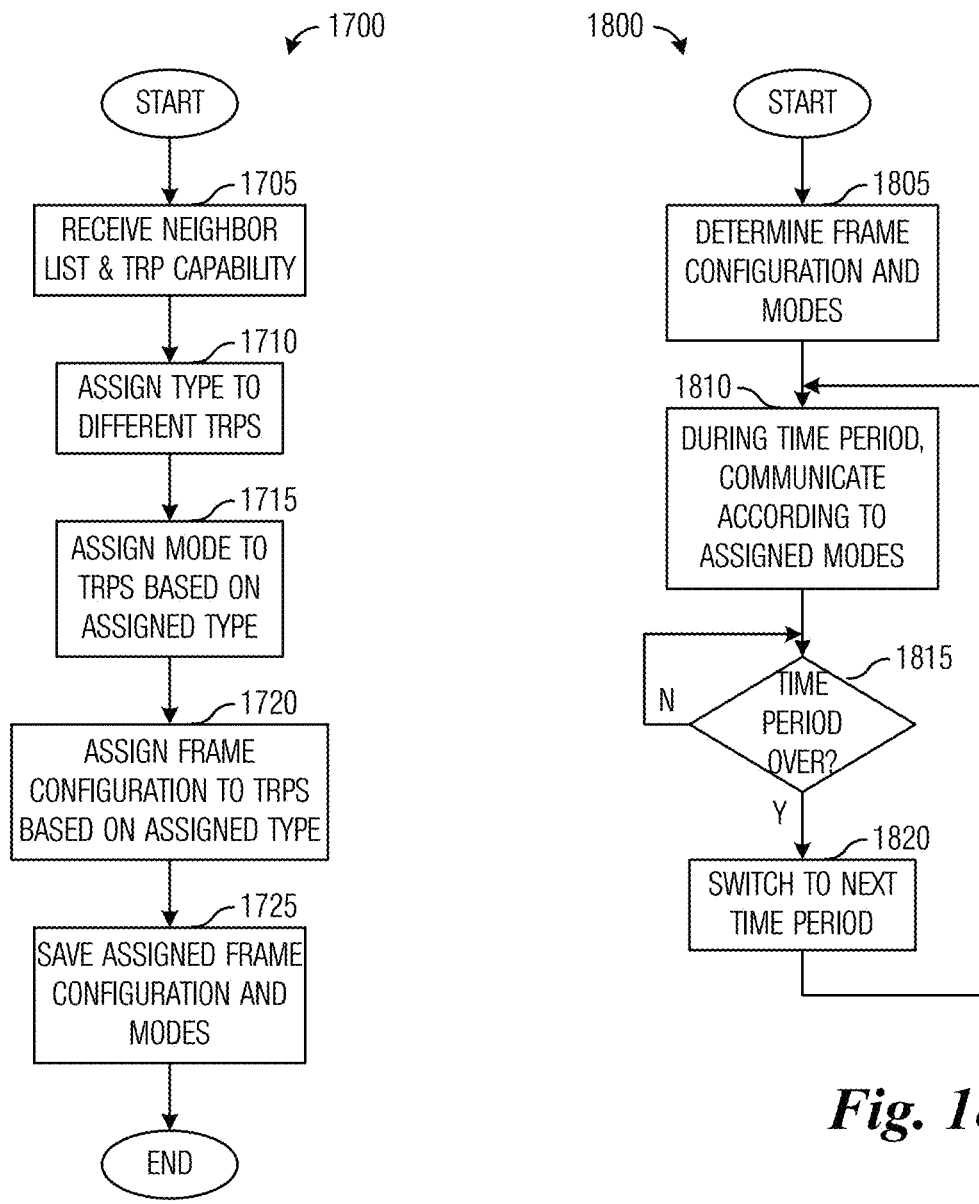
FIG. 17 illustrates a flow diagram of example operations occurring in a network entity performing backhaul mode to TDD backhaul subframe mapping according to embodiments presented herein.
FIG. 18 illustrates a flow diagram of example operations occurring in a TRP communicating using a high frequency backhaul link according to embodiments presented herein.

FIG. 17 illustrates a flow diagram of example operations 1700 occurring in a network entity performing backhaul mode to TDD backhaul subframe mapping. Operations 1700 may be indicative of operations occurring in a network entity, such as a TDD frame configuration entity or a network controlling entity, as the network entity performs backhaul mode to TDD backhaul subframe mapping.

Operations 1700 begin with the network entity receiving neighbor lists and TRP capability reports from TRPs (block 1705). The neighbor lists and TRP capability reports may be received from all TRPs of the communications system. Alternatively, the neighbor lists and TRP capability reports are received from newly deployed TRPs or TRPs, which have changed configuration. As an example, when a TRP determines that its neighboring TRPs have changed, the TRP sends a neighbor list and/or TRP capability report. As another example, when the capability of a TRP changes, the TRP sends a TRP capability report and/or neighbor list. Alternatively, the network entity receives information regarding the TRPs during network planning. The network entity assigns TRP types to the TRPs (block 1710). The assignment of the TRP types may be performed using a scheduling algorithm based on a topology of the communications system. Alternatively, the assignment of the TRP types may be performed using a scheduling algorithm that also considers the TRP capabilities. The network entity assigns backhaul modes to the TRPs in accordance with the assigned TRP types (block 1715). The network entity assigns TDD backhaul frame configurations to the TRPs in accordance with the assigned TRP types (block 1720). The network entity saves the TDD backhaul frame configuration and backhaul modes (block 1725). The TDD backhaul frame configuration and backhaul modes may be save to memory or database. Alternatively, the TDD backhaul frame configuration and backhaul modes may be provided directly to the TRPs.

FIG. 18 illustrates a flow diagram of example operations 1800 occurring in a TRP communicating using a high frequency backhaul link. Operations 1800 may be indicative of operations occurring in a TRP that is communicating using a high frequency backhaul link.

Operations 1800 begin with the TRP determining TDD backhaul frame configuration and backhaul modes (block 1805). The TDD backhaul frame configuration and backhaul modes may be retrieve from memory or database, retrieved from a network entity, or a neighboring TRP (such as a master TRP). Alternatively, the backhaul frame configuration and backhaul modes may be instructed directly in a message received from a network entity that made the assignment. During a time period, the TRP communicates using the high frequency backhaul in a manner commensurate with a backhaul mode corresponding to the time period (block 1810). The TRP performs a check to determine if the time period is over (block 1815). If the time period is not over, the TRP continues communicating as in block 1810. If the time period is over, the TRP switches to a next time period (block 1820) and returns to block 1810 to communicate in accordance with a backhaul mode corresponding to the next time period.

Figure 19:
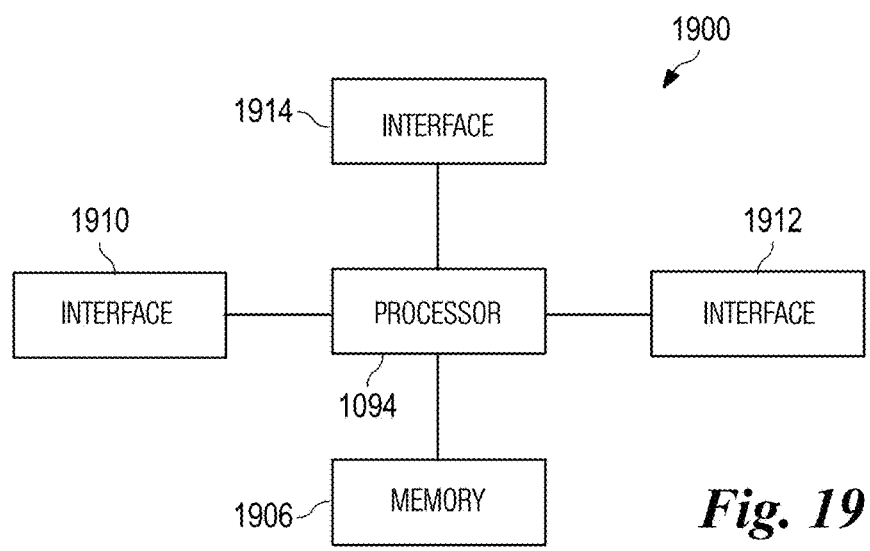
FIG. 19 illustrates a block diagram of an embodiment processing system for performing methods described herein.
Figure 10B:
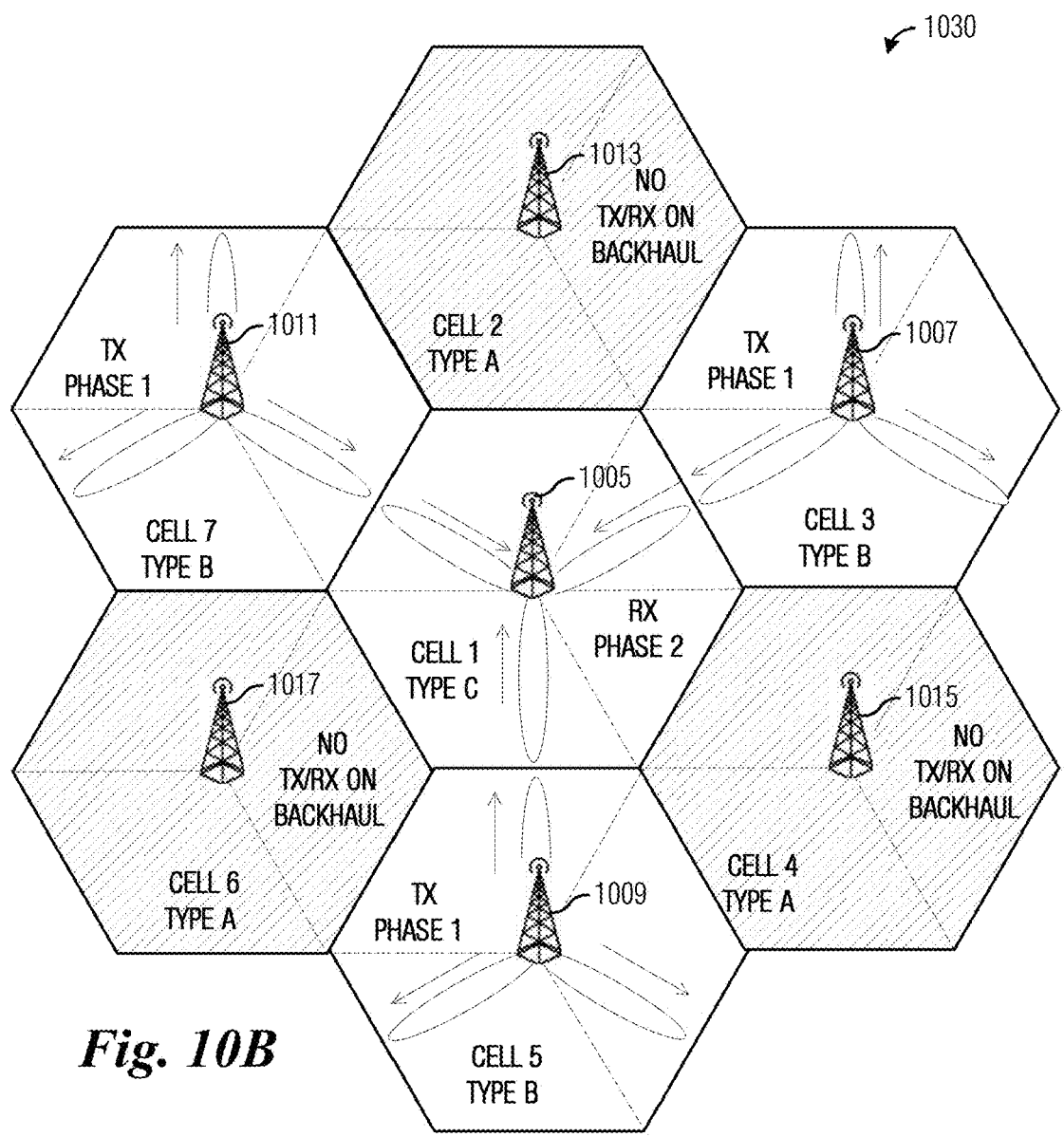

FIG. 19 illustrates a block diagram of an embodiment processing system 1900 for performing methods described herein, which may be installed in a host device. As shown, the processing system 1900 includes a processor 1904, a memory 1906, and interfaces 1910-1914, which may (or may not) be arranged as shown in FIG. 19. The processor 1904 may be any component or collection of components adapted to perform computations and/or other processing related tasks, and the memory 1906 may be any component or collection of components adapted to store programming and/or instructions for execution by the processor 1904. In an embodiment, the memory 1906 includes a non-transitory computer readable medium. The interfaces 1910, 1912, 1914 may be any component or collection of components that allow the processing system 1900 to communicate with other devices/components and/or a user. For example, one or more of the interfaces 1910, 1912, 1914 may be adapted to communicate data, control, or management messages from the processor 1904 to applications installed on the host device and/or a remote device. As another example, one or more of the interfaces 1910, 1912, 1914 may be adapted to allow a user or user device (e.g., personal computer (PC), etc.) to interact/communicate with the processing system 1900. The processing system 1900 may include additional components not depicted in FIG. 19, such as long term storage (e.g., non-volatile memory, etc.).

In some embodiments, the processing system 1900 is included in a network device that is accessing, or part otherwise of, a telecommunications network. In one example, the processing system 1900 is in a network-side device in a wireless or wireline telecommunications network, such as a base station, a relay station, a scheduler, a controller, a gateway, a router, an applications server, or any other device in the telecommunications network. In other embodiments, the processing system 1900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 20:
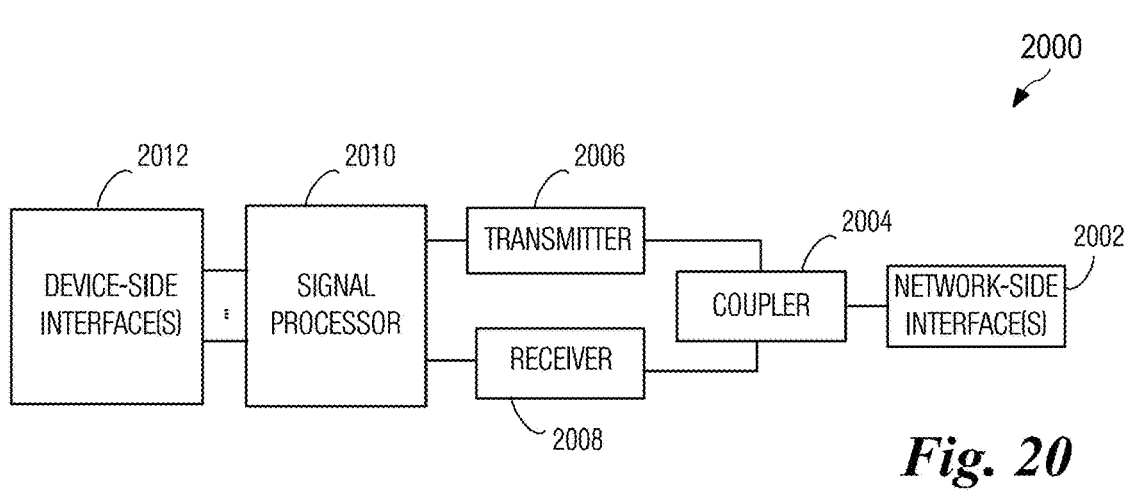
FIG. 20 illustrates a block diagram of a transceiver adapted to transmit and receive signaling over a telecommunications network according to embodiments presented herein.
Figure 10C:
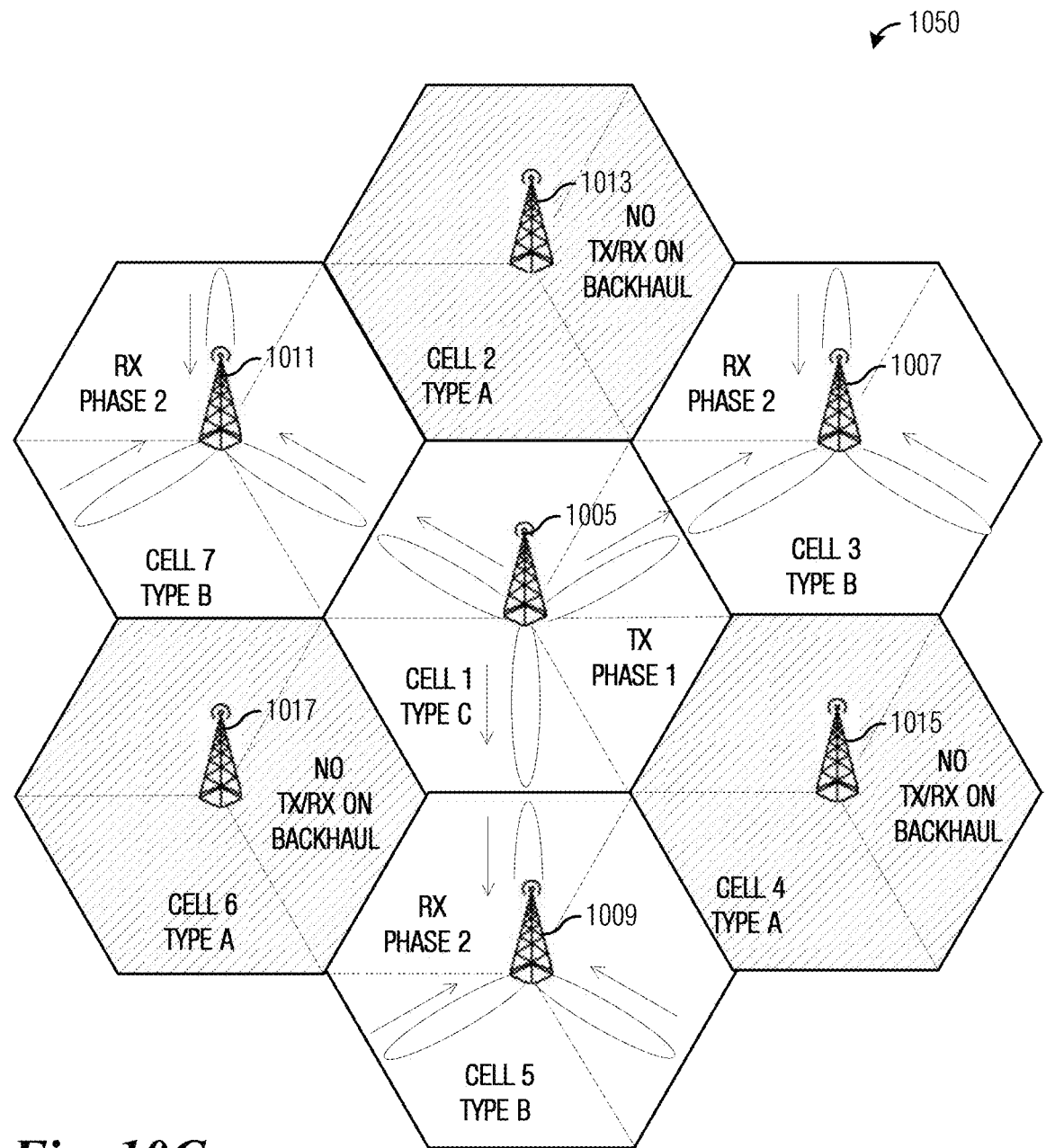
Figure 10D:
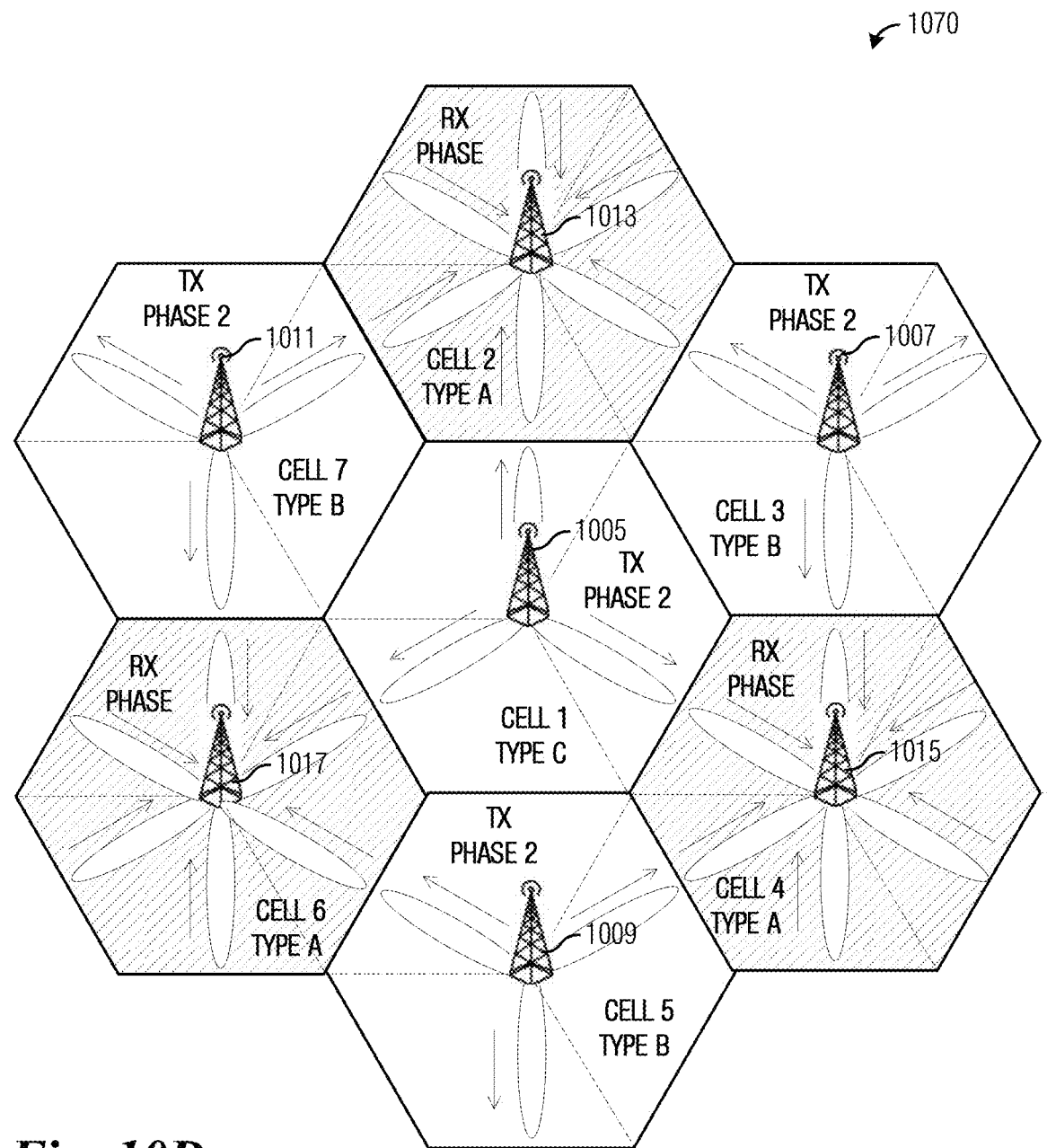

In some embodiments, one or more of the interfaces 1910, 1912, 1914 connects the processing system 1900 to a transceiver adapted to transmit and receive signaling over the telecommunications network. FIG. 20 illustrates a block diagram of a transceiver 2000 adapted to transmit and receive signaling over a telecommunications network. The transceiver 2000 may be installed in a host device. As shown, the transceiver 2000 comprises a network-side interface 2002, a coupler 2004, a transmitter 2006, a receiver 2008, a signal processor 2010, and a device-side interface 2012. The network-side interface 2002 may include any component or collection of components adapted to transmit or receive signaling over a wireless or wireline telecommunications network. The coupler 2004 may include any component or collection of components adapted to facilitate bi-directional communication over the network-side interface 2002. The transmitter 2006 may include any component or collection of components (e.g., up-converter, power amplifier, etc.) adapted to convert a baseband signal into a modulated carrier signal suitable for transmission over the network-side interface 2002. The receiver 2008 may include any component or collection of components (e.g., down-converter, low noise amplifier, etc.) adapted to convert a carrier signal received over the network-side interface 2002 into a baseband signal. The signal processor 2010 may include any component or collection of components adapted to convert a baseband signal into a data signal suitable for communication over the device-side interface(s) 2012, or vice-versa. The device-side interface(s) 2012 may include any component or collection of components adapted to communicate data-signals between the signal processor 2010 and components within the host device (e.g., the processing system 1900, local area network (LAN) ports, etc.).

The transceiver 2000 may transmit and receive signaling over any type of communications medium. In some embodiments, the transceiver 2000 transmits and receives signaling over a wireless medium. For example, the transceiver 2000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2002 comprises one or more antenna/radiating elements. For example, the network-side interface 2002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure and its advantages have been described in detail, it should be understood that various changes, substitutions, and alterations can be made herein without departing from the spirit and scope of the disclosure as defined by the appended claims.

What is claimed is:

1. A method for operating a network entity in a communications system, the method comprising:
   transmitting, by the network entity, a first signal indicating backhaul communication modes for a transmission-reception point (TRP), each of the backhaul communication modes configuring the TRP to use a corresponding subset of beams of the TRP for backhaul signal communications between the TRP and a corresponding subset of TRPs in a set of TRPs, the corresponding subset of beams of the TRP selected from a full set of beams of the TRP; and
   transmitting, by the network entity, a second signal indicating backhaul frame configurations to the TRP, each of the backhaul frame configurations configuring the TRP to use a corresponding arrangement of subframes for backhaul signal communications between the TRP and a corresponding subset of TRPs in the set of TRPs.

2. The method of claim 1, wherein the full set of beams includes a first corresponding subset of beams configured for backhaul signal communications between the TRP and a first corresponding subset of TRPs and a second corresponding subset of beams configured for backhaul signal communications between the TRP and a second corresponding subset of TRPs, the first corresponding subset of beams being mutually exclusive from the second first corresponding subset of beams.

3. The method of claim 2, wherein the second corresponding subset of TRPs is mutually exclusive from the first corresponding subset of TRPs.

4. The method of claim 1, wherein each of the backhaul communication modes mode further indicates a synchronized order of transmitting and receiving a backhaul signal by the TRP.

5. The method of claim 1, further comprising assigning, by the network entity, a TRP-type to the TRP using a scheduling algorithm, the scheduling algorithm assigning the TRP-type in accordance with a topology of the communications system or a capability of the TRP.

6. The method of claim 5, further comprising assigning, by the network entity, each of the backhaul communication modes mode to the TRP in accordance with a capability of the TRP or the TRP-type of the TRP.

7. The method of claim 1, wherein one of the backhaul frame configurations configures the TRP to use a special subframe for backhaul signal communications between the TRP and at least one corresponding set of TRPs, the special subframe subframes not being used for access communications between the TRP and one or more user equipments (UEs) accessing the communications system.

8. The method of claim 1, further comprising receiving, by the network entity, neighbor lists or TRP capability reports from at least one TRP in the set of TRPs.

9. The method of claim 8, wherein the neighbor lists or capability reports indicate that the at least one TRP is a newly deployed TRP, a reconfigured TRP, or has detected a change in capabilities or a change in neighboring TRPs.

10. The method of claim 1, further comprising receiving information regarding neighbor lists and TRP capability reports during network planning.

11. The method of claim 1, wherein the network entity is a time division duplexed (TDD) frame configuration entity or a network controlling entity.

12. The method of claim 1, wherein transmitting the second signal further comprises dynamically assigning, by the network entity, a respective time division duplexed (TDD) backhaul frame structure for backhaul signal communications between the TRP and each of the corresponding subsets subset of TRPs.

13. The method of claim 1, wherein transmitting the second signal further comprises semi-statically assigning, by the network entity, a respective time division duplexed (TDD) backhaul frame structure for backhaul signal communications between the TRP and each of the corresponding subsets subset of TRPs.

14. The method of claim 1, wherein the second signal is transmitted over a dedicated connection between the network entity and the TRP.

15. A network entity in a communications system, the network entity comprising:
a non-transitory memory storage comprising instructions; and
a processor in communication with the non-transitory memory storage, wherein the processor executes the instructions to:
transmit a first signal indicating backhaul communication modes for a transmission-reception point (TRP), each of the backhaul communication modes configuring the TRP to use a corresponding subset of beams of the TRP for backhaul signal communications between the TRP and a corresponding subset of TRPs in a set of TRPs, the corresponding subset of beams of the TRP selected from a full set of beams of the TRP; and
transmit a second signal indicating backhaul frame configurations to the TRP, each of the backhaul frame configurations configuring the TRP to use a corresponding arrangement of subframes for backhaul signal communications between the TRP and a corresponding subset of TRPs in the set of TRPs.

16. The network entity of claim 15, wherein the full set of beams includes a first corresponding subset of beams configured for backhaul signal communications between the TRP and a first corresponding subset of TRPs and a second corresponding subset of beams configured for backhaul signal communications between the TRP and a second corresponding subset of TRPs, the first corresponding subset of beams being mutually exclusive from the second corresponding subset of beams.

17. The network entity of claim 16, wherein the second corresponding subset of TRPs is mutually exclusive from the first corresponding subset of TRPs.

18. The network entity of claim 15, wherein each of the backhaul communication modes mode further indicates a synchronized order of transmitting and receiving a backhaul signal by the TRP.

19. The network entity of claim 15, wherein the programming further includes instructions to assign a TRP-type to the TRP using a scheduling algorithm, the scheduling algorithm assigning the TRP-type in accordance with a topology of the communications system or a capability of the TRP.

20. The network entity of claim 19, wherein the programming further includes instructions to assign each of the backhaul communication modes mode to the TRP in accordance with a capability of the TRP or the TRP-type of the TRP.

21. The network entity of claim 15, wherein one of the backhaul frame configurations configures the TRP to use a special subframe for backhaul signal communications between the TRP and at least one corresponding set of TRPs, the special subframe not being used for access communications between the TRP and one or more user equipments (UEs) accessing the communications system.

22. The network entity of claim 15, wherein the programming further includes instructions to receive neighbor lists or TRP capability reports from at least one TRP in the set of TRPs.

23. The network entity of claim 22, wherein the neighbor lists or capability reports indicate that the at least one TRP is a newly deployed TRP, a reconfigured TRP, or has detected a change in capabilities or a change in neighboring TRPs.

24. The network entity of claim 15, further comprising receiving information regarding neighbor lists and TRP capability reports during network planning.

25. The network entity of claim 15, wherein the network entity is a time division duplexed (TDD) frame configuration entity or a network controlling entity.

26. The network entity of claim 15, wherein transmitting the second signal further comprises dynamically assigning, by the network entity, a respective time division duplexed (TDD) backhaul frame structure for backhaul signal communications between the TRP and each of the corresponding subsets subset of TRPs.

27. The network entity of claim 15, wherein the instructions to transmit the second signal include instructions to:
semi-statically assign a respective time division duplexed (TDD) backhaul frame structure for backhaul signal communications between the TRP and each of the corresponding subsets subset of TRPs.

28. The network entity of claim 15, wherein the second signal is transmitted over a dedicated connection between the network entity and the TRP.

* * * * *

UNITED STATES PATENT AND TRADEMARK OFFICE
CERTIFICATE OF CORRECTION

PATENT NO. : 10,932,234 B2
APPLICATION NO. : 16/142970
DATED : February 23, 2021
INVENTOR(S) : Richard Stirling-Gallacher et al.

Page 1 of 2

It is certified that error appears in the above-identified patent and that said Letters Patent is hereby corrected as shown below:

In the Claims

In Column 26, Line 45, Claim 2, delete "from the second first" and insert --from the second--.

In Column 26, Line 51, Claim 4, delete "modes mode" and insert --modes--.

In Column 26, Line 61, Claim 6, delete "modes mode" and insert --modes--.

In Column 26, Line 67, Claim 7, delete "subframe subframes" and insert --subframe--.

In Column 27, Line 21, Claim 12, delete "subsets subset" and insert --subsets--.

In Column 27, Line 27, Claim 13, delete "subsets subset" and insert --subsets--.

In Column 28, Line 2, Claim 16, delete "from the second" and insert --from the first--.

In Column 28, Line 8, Claim 18, delete "modes mode" and insert --modes--.

In Column 28, Lines 11-12, Claim 19, delete "the programming further includes instructions" and insert --the processor further executes the instructions--.

In Column 28, Lines 16-17, Claim 20, delete "the programming further includes instructions" and insert --the processor further executes the instructions--.

In Column 28, Line 18, Claim 20, delete "modes mode" and insert --modes--.

In Column 28, Lines 22-23, Claim 21, delete "to use a special subframe" and insert --to use special subframe--.

In Column 28, Line 25, Claim 21, delete "the special subframe not being used" and insert --the special Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office* subframes not being used--.

In Column 28, Lines 28-29, Claim 22, delete "the programming further includes instructions" and insert --the processor further executes the instructions--.

In Column 28, Line 47, Claim 26, delete "subsets subset" and insert --subsets--.

In Column 28, Line 53, Claim 27, delete "subsets subset" and insert --subsets--.